(12) United States Patent
Erlston et al.

(10) Patent No.: US 9,702,443 B2
(45) Date of Patent: *Jul. 11, 2017

(54) KINETIC ENERGY RECOVERY AND HYDRAULIC DRIVE FOR VEHICLES

(71) Applicant: KERSTECH, INC., Beaverton, OR (US)

(72) Inventors: Lester J. Erlston, Beaverton, OR (US); Michael D. Miles, Portland, OR (US)

(73) Assignee: KERSTECH, INC., Beaverton, OR (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/315,063

(22) Filed: Jun. 25, 2014

(65) Prior Publication Data

US 2014/0305260 A1    Oct. 16, 2014

Related U.S. Application Data

(63) Continuation of application No. 12/808,664, filed as application No. PCT/US2008/087726 on Dec. 19, 2008, now Pat. No. 8,798,828.

(Continued)

(51) Int. Cl.
*F16H 33/02* (2006.01)
*B60K 6/26* (2007.10)
(Continued)

(52) U.S. Cl.
CPC ............ *F16H 33/02* (2013.01); *B60K 6/26* (2013.01); *B60K 6/52* (2013.01); *B60L 3/0061* (2013.01);
(Continued)

(58) Field of Classification Search
None
See application file for complete search history.

(56) References Cited

U.S. PATENT DOCUMENTS 3,717,954 A    2/1973   Sheckells
4,714,853 A   12/1987   Palmero et al.
(Continued)

OTHER PUBLICATIONS http://www.applimotion.com/ult.php, "ULT Motors" product listing, Applimotion, Inc., Loomis, California, accessed Jun. 16, 2010.
(Continued)

*Primary Examiner* — Paul Danneman
(74) *Attorney, Agent, or Firm* — Marger Johnson

(57) ABSTRACT

A kinetic energy recovery and electric drive system for automotive vehicles comprises an electric pancake motor-generator having its stator housing coupled, combined or integrated with the gearbox housing of a gearbox or final drive mechanism and its rotor shaft oriented vertically and perpendicular to the drive-shaft or drive axle of the vehicle. In certain embodiments the pancake motor rotor may be fitted or integral with a perpendicular peripheral stiffening flange in which is located a plurality of equally spaced permanent magnets of alternating polarity that electromagnetically engage with electromagnets of the pancake motor-generator stator. To facilitate retrofitting to existing vehicles the system may include an autonomous hybrid controller that includes at least one sensor to detect motion of the vehicle and/or motor without requiring any interface or integration with the vehicle's subsystems.

14 Claims, 17 Drawing Sheets

Related U.S. Application Data

(60) Provisional application No. 61/015,040, filed on Dec. 19, 2007, provisional application No. 61/127,499, filed on May 14, 2008.

(51) Int. Cl.
  *B60K 6/52* (2007.10)
  *B60L 3/00* (2006.01)
  *B60L 11/00* (2006.01)
  *B60L 11/14* (2006.01)
  *B60L 15/20* (2006.01)

(52) U.S. Cl.
  CPC .............. *B60L 11/005* (2013.01); *B60L 11/14* (2013.01); *B60L 15/2009* (2013.01); *B60L 2220/50* (2013.01); *B60L 2240/12* (2013.01); *B60L 2240/14* (2013.01); *B60L 2240/32* (2013.01); *B60L 2240/36* (2013.01); *B60L 2240/421* (2013.01); *B60L 2240/423* (2013.01); *B60L 2240/425* (2013.01); *B60L 2240/642* (2013.01); *B60L 2250/26* (2013.01); *B60L 2260/28* (2013.01); *B60L 2270/145* (2013.01); *Y02T 10/6265* (2013.01); *Y02T 10/641* (2013.01); *Y02T 10/645* (2013.01); *Y02T 10/70* (2013.01); *Y02T 10/7022* (2013.01); *Y02T 10/7077* (2013.01); *Y02T 10/72* (2013.01); *Y02T 10/7275* (2013.01); *Y02T 10/7291* (2013.01); *Y02T 10/92* (2013.01); *Y02T 90/16* (2013.01); *Y10T 74/19051* (2015.01); *Y10T 477/393* (2015.01)

(56) References Cited

U.S. PATENT DOCUMENTS

| | | |
|---|---|---|
| 5,562,565 A | 10/1996 | Moroto et al. |
| 5,947,855 A | 9/1999 | Weiss |
| 6,165,094 A | 12/2000 | Williames |
| 6,184,603 B1 | 2/2001 | Hamai et al. |
| 6,208,036 B1 | 3/2001 | Evans et al. |
| 6,290,605 B1 | 9/2001 | Coenen et al. |
| 6,302,249 B1 | 10/2001 | Jolly et al. |
| 6,484,834 B2 | 11/2002 | Bowen et al. |
| 6,552,460 B2 | 4/2003 | Bales |
| 6,930,433 B2 | 8/2005 | Bales et al. |
| 6,935,451 B2 | 8/2005 | Bell et al. |
| 7,115,057 B2 | 10/2006 | House |
| 7,255,187 B2 | 8/2007 | Bell et al. |
| 7,432,623 B2 | 10/2008 | Ritz, Jr. et al. |
| 8,798,828 B2 * | 8/2014 | Erlston ............... B60K 6/26 701/22 |
| 2004/0173393 A1 * | 9/2004 | Man .................. B60K 6/365 180/65.21 |
| 2005/0052080 A1 * | 3/2005 | Maslov ............... B60L 8/00 307/10.1 |
| 2007/0170810 A1 | 7/2007 | Hirzel |

OTHER PUBLICATIONS

International Search Report and Written Opinion for international application PCT/US2008/087726, dated May 5, 2009, 11 pages, ISA/US, Alexandria, Virginia.

\* cited by examiner

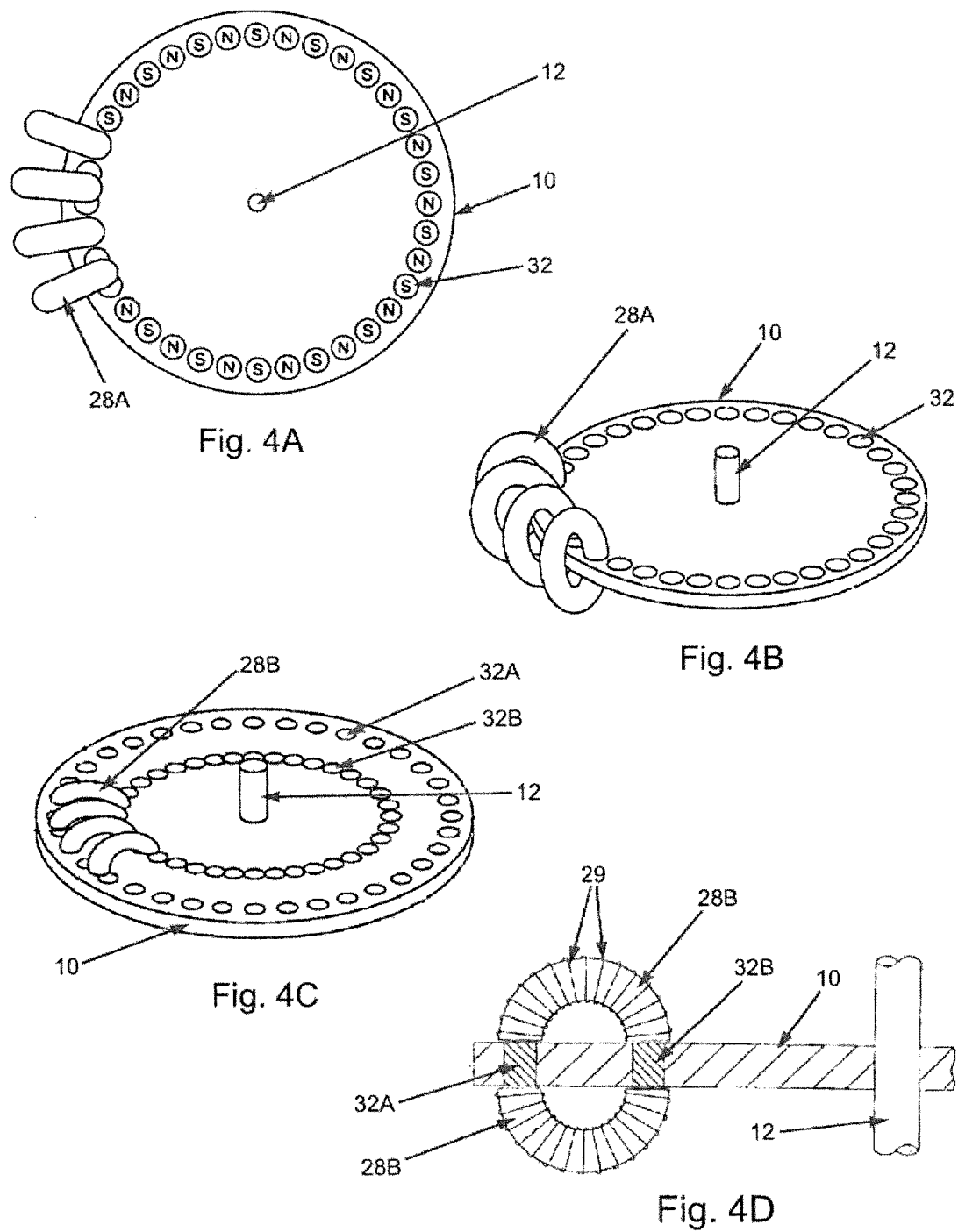

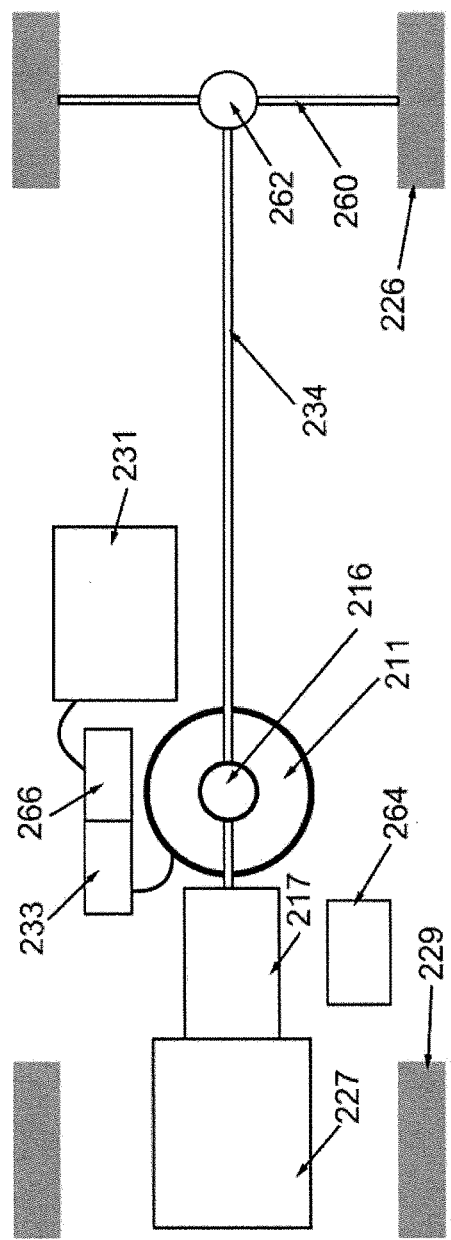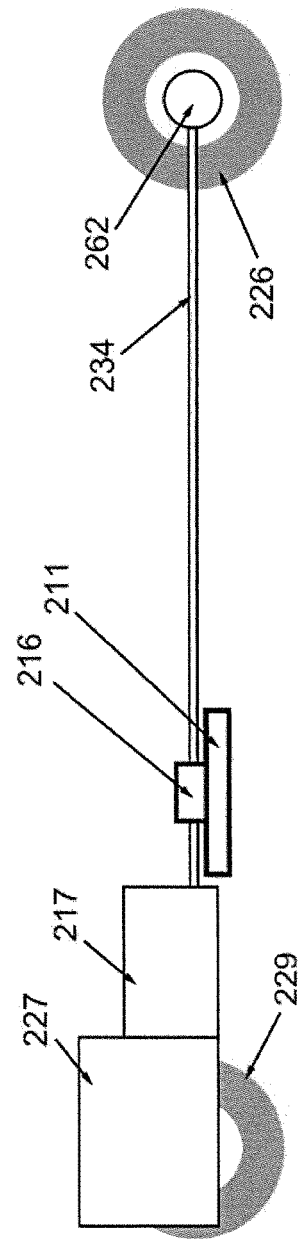

KINETIC ENERGY RECOVERY AND HYDRAULIC DRIVE FOR VEHICLES

RELATED APPLICATION DATA

This application is a continuation of U.S. patent application Ser. No. 12/808,664, filed 16 Jun. 2010, now U.S. Pat. No. 8,798,828, entitled "Kinetic Energy Recovery and Electric Drive for Vehicles," which is a 371 of PCT/US2008/087726, filed 19 Dec. 2008, which claimed the benefit of U.S. provisional patent application Ser. No. 61/015,040, filed 19 Dec. 2007, entitled "Kinetic Energy Recovery and Electric Drive for Vehicles," and U.S. provisional patent application Ser. No. 61/127,499, filed 14 May 2008, entitled "Controller for Hybrid Vehicles," incorporated herein by reference.

FIELD OF THE INVENTION

This invention relates to a kinetic energy recovery and electric drive mechanism for powered vehicles that combines a pancake-type electric motor-generator with a gearbox located in the driveline of said vehicle.

BACKGROUND OF THE INVENTION

The rising cost of petroleum based fuels is generating increased demand for hybrid electric and internal combustion engined vehicles and pure electric vehicles (EVs) which in turn will create a need for kinetic energy, commonly termed braking energy, recovery and regeneration systems. Such regeneration systems convert a portion of a vehicle's kinetic energy normally dissipated as heat during braking into energy storable for future use. The recovered energy may be generated and stored pneumatically, hydraulically or in a flywheel, but most commonly it is generated as electricity and stored in batteries or supercapacitors.

The primary electric motor-generator of a hybrid or EV regenerates only a portion of the kinetic energy normally dissipated as heat during braking; auxiliary generators may be useful to supplement and maintain the battery or supercapacitor charge to increase the vehicle's useful driving range.

U.S. Pat. Nos. 7,255,187, 7,115,057, 6,935,451, 6,484,834, 6,208,036, 6,184,603, 5,947,855 and 5,562,565 are among numerous patents that describe transmission or final drive mechanisms in combination with electric motor-generators. None, however, incorporate pancake-type electric motor-generators orienting their rotor shafts vertically and/or perpendicular to the transmission output shaft, to engage with the final drive gears, or combine or integrate the motor-generator stator housing with the final drive housing.

The current invention is suitable for use as both a primary and a supplementary energy regeneration and reuse mechanism as its integrated design, location in the vehicle and pancake-type electric motor-generator lends itself to compact, space efficient sizing, low weight and efficient power and torque generation.

In addition, the kinetic energy regeneration mechanism can provide full-time or as-needed all-wheel-drive functionality to front-wheel-drive and rear-wheel-drive vehicles; for example, a front-wheel-drive vehicle would have such a mechanism to drive the rear wheels, while rear-wheel-drive vehicles would have the mechanism to drive the front wheels.

Current original equipment hybrid vehicles typically integrate their electric drive into the transmission and therefore such technology is unsuitable for retrofitting existing internal combustion drive vehicles. The existing fleet of internal combustion only vehicles will take decades to be replaced by hybrid vehicles.

SUMMARY OF THE INVENTION

This invention provides a unique arrangement that allows a kinetic energy regeneration mechanism to be mounted low in the vehicle chassis for a low center of gravity and with minimal encroachment on vehicle interior space or ground clearance.

The invention is a kinetic energy recovery and reuse mechanism that comprises a combination or integration of a gearbox drive mechanism, including but not limited to final drives, differentials and transaxles, of vehicles such as automobiles, buses, trucks, rail vehicles or other wheeled vehicles and a pancake-type or ring-type electric motor-generator, hereinafter collectively called pancake motor-generators. Such pancake motor-generators include, but are not limited to, those of the type manufactured by Applimotion Inc. of California, USA and those disclosed in U.S. Pat. Nos. 6,552,460, 6,930,433 and 7,432,623 and which are hereby incorporated by reference in their entirety.

Pancake motor-generators typically permit axial compactness while enabling large rotor diameters for higher power and torque generation. The brushless DC electric motor-generators as disclosed in the abovementioned patents comprise a disc or ring-like rotor having a plurality of equally spaced permanent magnets of alternating polarity arrayed radially about the rotor periphery that engages with a plurality of electromagnet cores that form the stator. When energized, the stator electromagnet cores are triggered to switch polarity in a sequence that attracts and repels the permanent magnets, causing the rotor to rotate. The motor may be operated as a generator using the rotor as a mechanical input device. In this mode, current induced in the electromagnets' coils by the rotation of the rotor charges an electricity storage device such as a battery or supercapacitor.

The invention combines, integrates or affixes the pancake motor-generator stator housing, which contains an electromagnet or plurality of electromagnets, with a gearbox housing, including but not limited to differential, final drive and transaxle housings. The pancake motor-generator rotor is oriented in a substantially horizontal plane and is mounted either above or below the gearbox housing. The pancake electric motor-generator rotor shaft is substantially vertical and perpendicular to the vehicle transmission driveshaft and may be engaged via an appropriate power transmission mechanism such as, but not limited to, gear drives and friction drives, including single ratio, multiple changeable ratios or continuously variable ratios with the final drive gears, typically a ring and pinion gearset, or to a power transmission mechanism, such as, but not limited to, a gear drive or friction drive specifically located on the driveshaft adjacent to the gearbox.

The major advantage of a pancake motor-generator is that its "flatness" and "thinness" permits it to be mounted low in the vehicle chassis, enabling a low vehicle center of gravity, yet not significantly encroach on the vehicle's ground clearance and interior or storage space. Various pancake motor-generator designs may be employed in the current invention; however, the pancake motor-generators as manufactured by Applimotion, Inc. and those disclosed in the '460, '433 and '623 patents are preferred.

An advantage of the '460, '433 and '623 patents is the ability to arrange the electromagnet cores' location within the stator housing, and even to omit certain cores, in such a manner as to allow sufficient space for components that may engage with or may be affixed to the gearbox or final drive housing, such as a transmission housing, drive-shafts, half-shafts, axles, and suspension arms and linkages. This arrangement enables the stator housing to be designed substantially around the gearbox or final drive housing, which in certain applications may be preferable to locating the stator housing above or below the gearbox or final drive housing.

The invention may employ the '460 and '433 patents' single-gap electromagnet cores or the '623 patent's double-gap electromagnet cores to optimize power generation and compactness of the pancake motor-generator. Similarly, the plurality of equally-spaced permanent magnets of alternating polarity may be mounted in various rotor configurations to optimize power generation and compactness of the pancake motor-generator for particular applications.

To improve the compactness and efficiency of the combined pancake motor-generator and gearbox mechanism it may be advantageous to configure the rotor with features that may include, but are not limited to, perpendicular, angled, parallel or concentric coaxial annular flanges or projecting elements located on the periphery and/or one or both sides of the rotor, on which is mounted the plurality of equally spaced permanent magnets of alternating polarity that magnetically engage with the electromagnet cores of the pancake motor-generator. The annular flanges or projecting elements may be affixed to or integral with the rotor. The annular flanges or projecting elements may use different materials and manufacturing processes to that of the rotor, such as, but not limited to, cast, stamped or forged aluminum, steel and titanium, and carbon fiber. The rotor and annular flanges or projecting elements may be vented, vaned, ribbed, drilled and otherwise shaped, formed or featured to dissipate heat and/or cause or assist cooling of the motor-generator components.

The invention is applicable to front wheel drive vehicles having a final drive at the front wheels, rear wheel drive vehicles having a final drive at the rear wheels, and to all-wheel-drive or four-wheel-drive vehicles having final drives at both the front and at the rear axles. The invention may also be used to enable all-wheel-drive functionality in a two-wheel drive vehicle by fitting an axle or half-shafts and a final drive incorporating the invention to the front wheels of a rear-wheel-drive vehicle or by fitting an axle or half-shafts and a final drive incorporating the invention to the rear wheels of a front-wheel-drive vehicle. The invention may be located on the driveshaft or axles of a vehicle or include a layshaft parallel to the driveshaft or axles.

The kinetic energy recovery and reuse mechanism is suitably wired to operate during braking, coasting on a trailing throttle and acceleration. The generator function is typically activated, by appropriate switch devices, when the brakes are applied or the accelerator is released. Applying the accelerator or releasing the brakes disengages the generator function. While the generator function is engaged, when the vehicle is being braked or is coasting on a trailing throttle, the rotation of the vehicle's wheels drives the rotation of the motor-generator rotor via the final drive gears, causing current to be induced in the electromagnet core's coils and then stored in an electric power storage device, such as a battery or supercapacitor. In electric motor mode, electric power stored in the power storage device is used to rotate the motor rotor and so drive the vehicle's wheels via the final drive gearing. The motor function may be engaged, either automatically when the accelerator is applied, or at the driver's discretion by means of a switch device or other engagement mechanism.

Those skilled in the art of hybrid electric vehicles will understand the need for a hybrid control system to manage the performance of the vehicle's internal combustion engine and other subsystems, such as braking, engine and throttle management systems, to interact appropriately with the electric motor-generator and electric energy storage device, such as a battery or supercapacitor, so as to optimize the generation, storage and use of the vehicle's electric energy.

Typically, in an OEM hybrid vehicle, the hybrid control system monitors and adjusts all aspects of the hybrid powertrain, regulating the internal combustion engine and the electric motor-generator to meet the driving demands signaled by the gear shift, accelerator and brake pedal positions and the vehicle speed. This is achieved by having the hybrid control system fully integrated with the vehicle's subsystems at the OEM manufacture stage.

In certain retrofit hybrid applications it may be more practical and cost-effective to retrofit an autonomous hybrid control system that minimizes the expense and difficulty of achieving full integration with the host vehicle's existing installed systems and subsystems and without requiring any interface with such systems, and without compromising the operation and functionality of the vehicle. Such a low cost, simple-to-install autonomous hybrid controller is described hereunder. This invention is well suited for retrofitting to buses and other truck-type vehicles.

The foregoing and other objects, features and advantages of the invention will become more readily apparent from the following detailed description of preferred embodiments of the invention which proceed with reference to the accompanying drawings.

BRIEF DESCRIPTION OF THE DRAWINGS

FIGS. 4A-4D illustrate the rotor, permanent magnet and electromagnetic core configurations according to U.S. Pat. Nos. 6,552,460, 6,930,433 and 7,432,623.

FIGS. 12A and 12B are schematic plan and side views respectively of an embodiment of the invention mounted in a front engined vehicle.

DETAILED DESCRIPTION OF THE DRAWINGS

Depending upon a particular application it may be advantageous to locate the pancake motor-generator horizontally either above or below the gearbox mechanism.

Figure 1A:
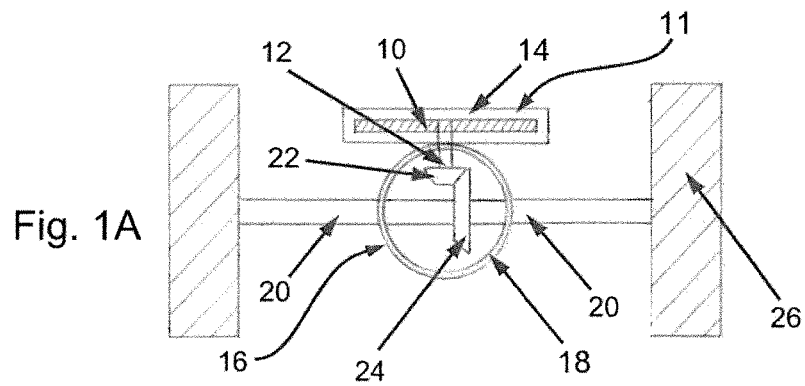
FIGS. 1A-1D schematically illustrate a kinetic energy recovery mechanism designed according to various embodiments of this invention, showing cross-sectional elevation views of alternative combinations of a vehicle final drive mechanism and pancake motor-generator located above the final drive.
Figure 1B:
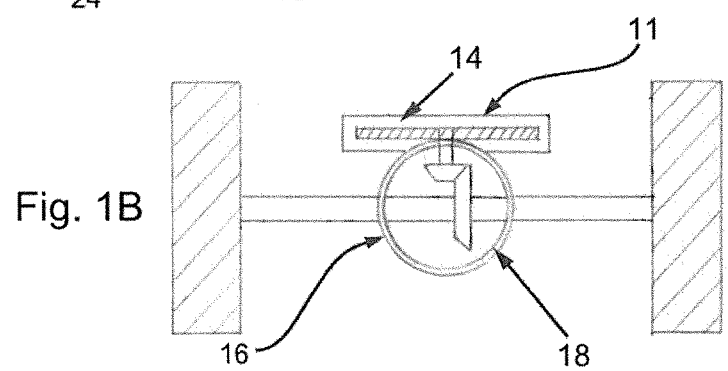
Figure 1C:
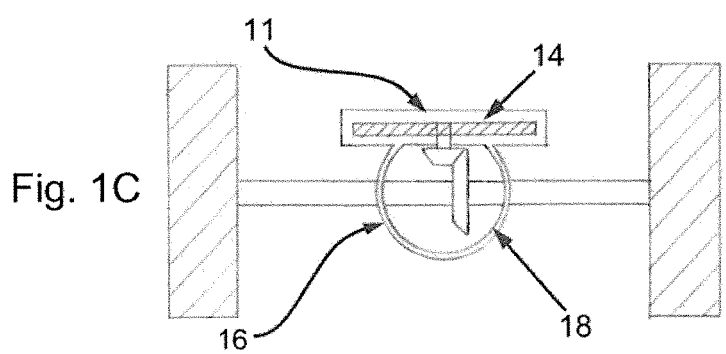
Figure 1D:
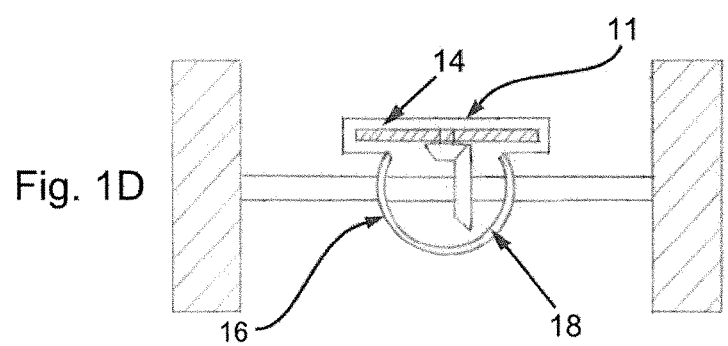

FIG. 1A shows a schematic embodiment of the invention, with pancake motor-generator 11 located above and affixed to or integral with final drive mechanism 16 which includes ring gear 24 and rotor shaft pinion 22. The final drive mechanism may include a differential mechanism, not shown. Pancake motor-generator housing 14 contains and supports an array of electromagnet cores, not shown in FIG. 1 but illustrated in FIGS. 3 to 7. Rotor 10, which supports a radial array of permanent magnets 32 of alternating polarity, not shown in FIG. 1 but illustrated in FIGS. 4, 6 and 7, is affixed to vertical rotor shaft 12 that is affixed to rotor shaft pinion 22 which engages with ring gear 24 that is connected to axle or half-shafts 20. Wheels 26 are mounted to an axle or half-shafts 20. FIGS. 1B, 1C and 1D show slightly differing versions of FIG. 1A, with pancake motor-generator housing 14 affixed or integrated closer to final drive housing 18, making the combined pancake motor-generator and final drive kinetic energy recovery mechanism more vertically compact for minimum intrusion into the interior space of the vehicle.

Figure 2A:
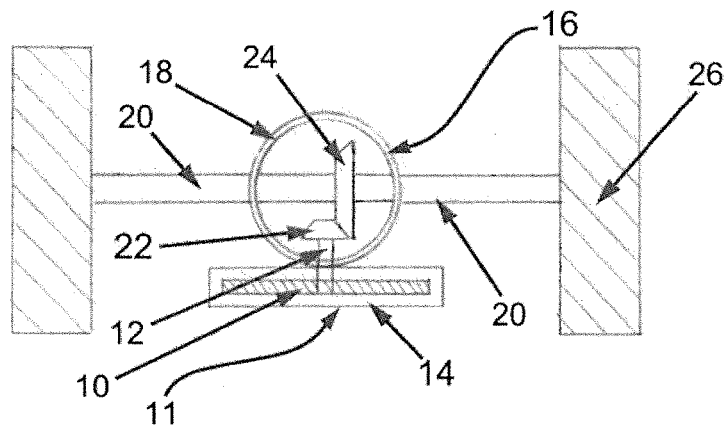
FIGS. 2A-2D schematically illustrate a kinetic energy recovery mechanism designed according to other embodiments of this invention, showing cross-sectional elevation views of alternative combinations of a vehicle final drive mechanism and pancake motor-generator located below the final drive.
Figure 2B:
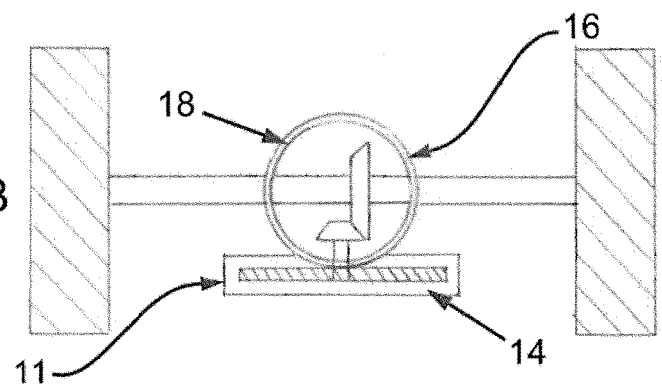
Figure 2C:
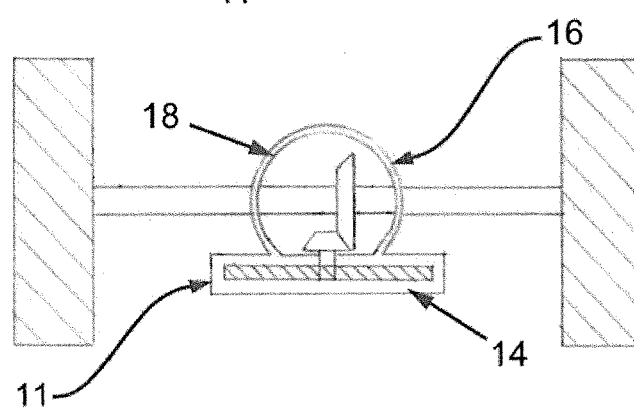
Figure 2D:
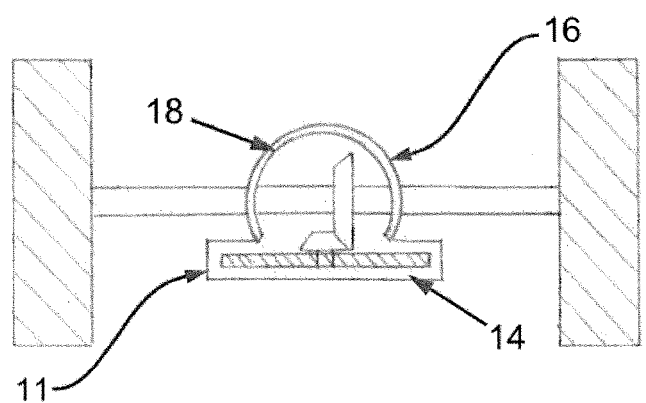

FIG. 2A shows a schematic embodiment of the invention, with pancake motor-generator 11 located below and affixed to or integral with final drive mechanism 16 which contains ring gear 24 and rotor shaft pinion 22. The final drive mechanism may include a differential mechanism, not shown. Pancake motor-generator housing 14 contains and supports an array of electromagnet cores, not shown in FIG. 2 but illustrated in FIGS. 3 to 7. Rotor 10, which supports a radial array of permanent magnets 32 of alternating polarity, not shown in FIG. 2 but illustrated in FIGS. 4, 6 and 7, is affixed to rotor shaft 12 that is affixed to rotor shaft pinion 22 which engages with ring gear 24 that is connected to axle or half-shafts 20. Wheels 26 are mounted to axle or half-shafts 20. FIGS. 2B, 2C and 2D show slightly differing versions of FIG. 2A, with pancake motor-generator housing 14 affixed or integrated closer to final drive housing 18, making the combined pancake motor-generator and final drive kinetic energy recovery and reuse mechanism more vertically compact for minimum intrusion into the ground clearance of the vehicle.

From FIG. 1 and FIG. 2 it can be seen that, when wheels 26 are rotated by the forward or rearward motion of the vehicle, rotor shaft 12 and therefore rotor 10 will be rotated via ring gear 24 and rotor shaft pinion 22 that form part of final drive mechanism 16. This will, when pancake motor-generator 11 is switched to generator mode, cause electric current to be induced in the electromagnet cores for storage in an electricity storage device, such as a battery or ultra-capacitor, not shown. In similar fashion, when motor-generator 11 is switched to motor mode, electric current from the electricity storage device will, due to electromagnetic interaction between the electromagnet cores 28 and the plurality of permanent magnets 32 of alternating polarity in rotor 10, cause rotor 10 to rotate, in turn causing wheels 26 to rotate and propel the vehicle.

Figure 3A:
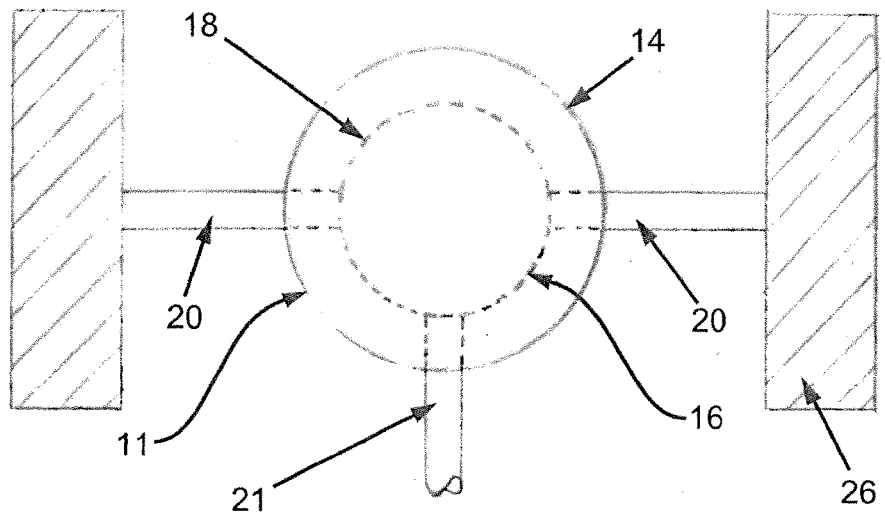
FIGS. 3A and 3B schematically illustrate embodiments of the invention, showing cross-sectional plan views of alternative stator housing configurations.
Figure 3B:
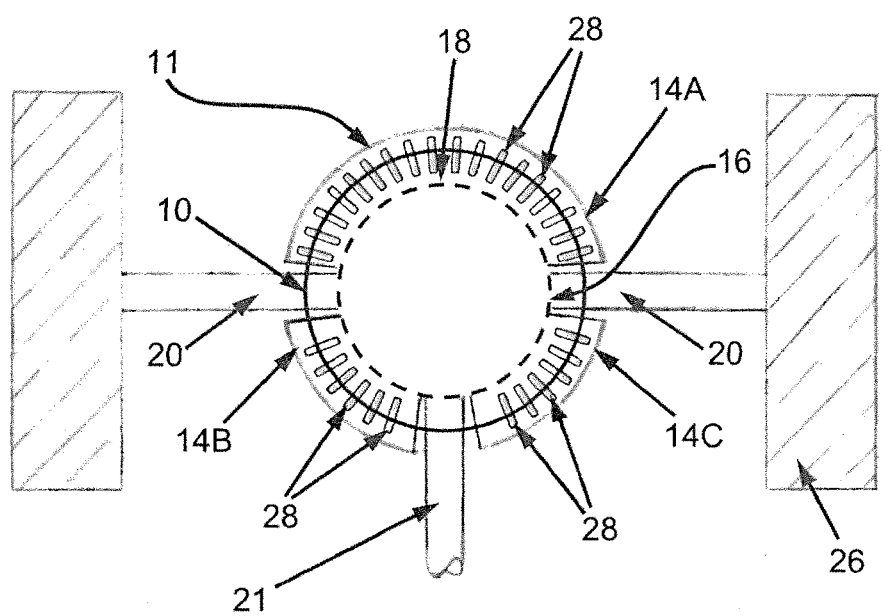

FIG. 3 shows views from above the vehicle, in this embodiment with the pancake motor-generator 11 mounted in a front-engined, rear wheel drive vehicle such as an automobile, bus or truck. FIGS. 3A and 3B show drive shaft 21 connected to final drive mechanism 18 and axle or half-shafts 20 connected to final drive mechanism 18 and to wheels 26. FIG. 3A depicts pancake motor-generator stator housing 14 above and affixed to or integral with final drive mechanism 18.

FIG. 3B depicts a pancake motor-generator comprising a series of electromagnet cores 28 contained within radial stator housing sectors 14A, 14B and 14C, sector 14A located around the rear of final drive mechanism 18 and behind axle or half-shafts 20, and sectors 14B and 14C located around final drive mechanism 18 between axle or half-shafts 20 and drive shaft 21. The ability to locate electromagnet cores 28 and stator housing sectors 14A, 14B and 14C as separate sectors with gaps between the sectors to accommodate axle or half shafts 20 and drive shaft 21 permits pancake motor-generator stator housing 14 to be mounted closer to final drive mechanism 18 for maximum vertical compactness.

FIGS. 4A and 4B depict a brushless DC electric pancake motor-generator with a rotor, permanent magnet and electromagnetic core configuration according to U.S. Pat. Nos. 6,552,460 and 6,930,433. FIGS. 4C and 4D depict the rotor, permanent magnet and electromagnetic core configuration according to U.S. Pat. No. 7,432,623. FIG. 4A is a plan view and FIG. 4B a perspective view of such a brushless DC electric pancake motor-generator comprising a stator having a series of electromagnet cores 28A and a plurality of equally spaced permanent magnets 32 of alternating polarity mounted on rotor 10 so as to electromagnetically engage with the slotted electromagnetic cores 28 of the stator in the manner described in the '460 and '433 patents. Electromagnet cores 28 may be of toroidal, "c" shaped or other suitable shape, and are slotted or gapped to enable the plurality of permanent magnets 32 of alternating polarity on the rotor 10 to pass through. Rotor shaft 12 is affixed at the center of rotor 10. FIG. 4C is a perspective view and FIG. 4D a cross-sectional view of a brushless DC electric motor-generator comprising a stator having a series of electromagnet cores 28B and an outer ring 32A of equally spaced permanent magnets of alternating polarity and an inner ring 32B of equally spaced permanent magnets of alternating polarity mounted on rotor 10 so as to engage electromagnetically with electromagnet cores 28B of the stator in the manner described in U.S. Pat. No. 7,432,623. Electromagnet cores 28B may be half-toroidal, "u" shaped or other suitable shape. A pair of such half-toroidal or "u-shaped" electromagnet cores 28B are spaced apart with their arm ends facing each other to enable the plurality of equally spaced permanent magnets 32A and 32B on rotor 10 to pass through. Windings 29 are shown around cores 28B.

Figure 5A:
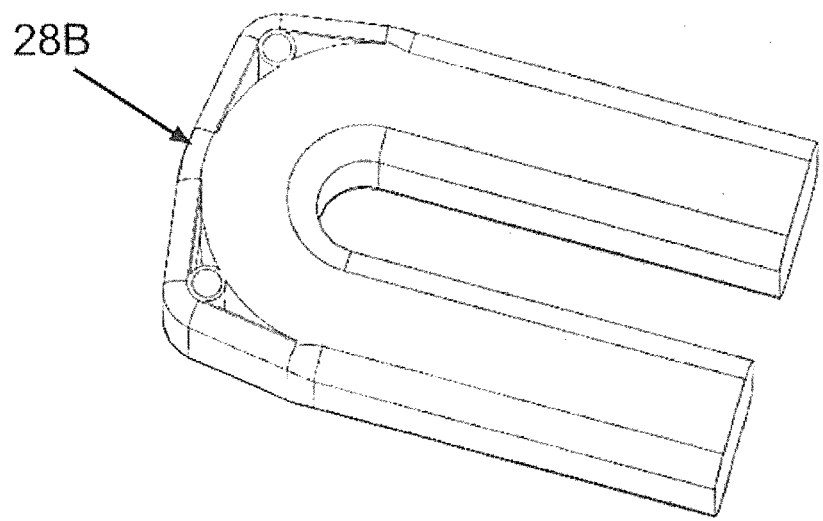
FIGS. 5A and 5B show an electromagnetic U-core as disclosed in U.S. Pat. No. 7,432,623 with and without its copper windings.

FIG. 5A shows "u-shaped" electromagnet core 28B as disclosed in U.S. Pat. '623.

Figure 5B:
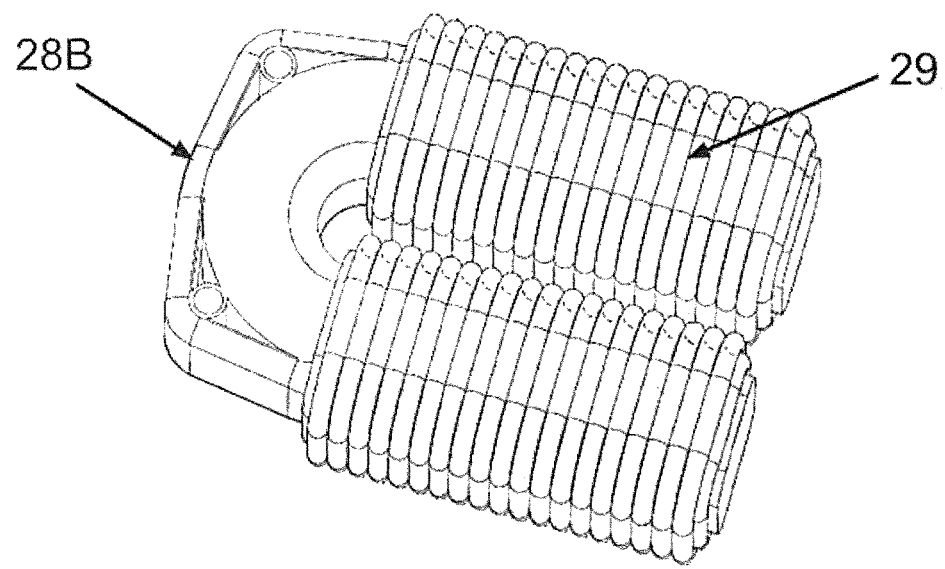

FIG. 5B depicts electromagnet core 28B with copper windings 29.

Figure 6A:
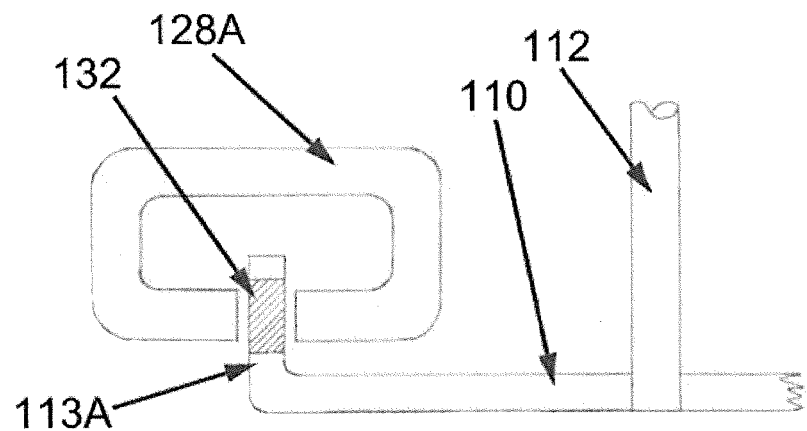
FIGS. 6A and 6B schematically illustrate cross-sectional views of the motor-generator according to embodiments of the invention, the rotor having a perpendicular, annular flange located at its periphery.
Figure 6B:
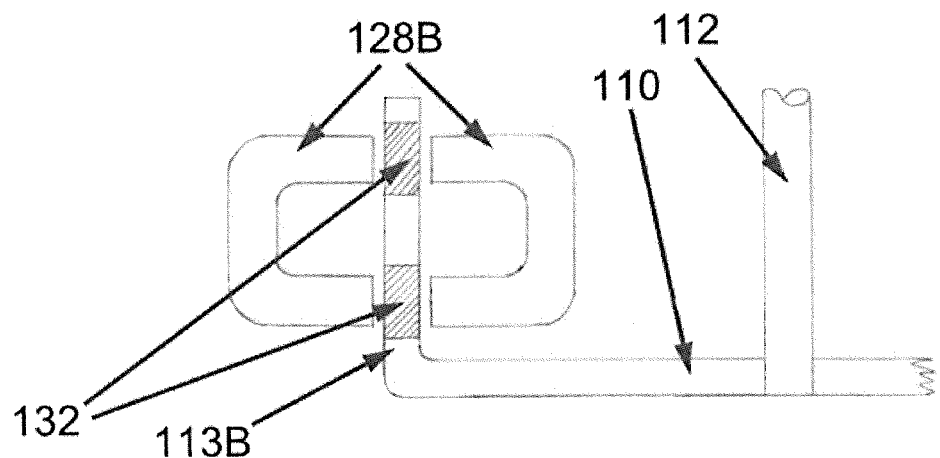

FIGS. 6A and 6B schematically illustrate cross-sectional views of other embodiments of rotor 110 having a perpendicular, annular flange 113A or 113B located at the periphery of rotor 110. A plurality of equally spaced permanent magnets 132 are located on flange 113A,113B. Flange 113A, 113B may be affixed to or integral with rotor 110 and is shaped and arranged in such a fashion that pluralities of permanent magnets 132 of alternating polarity may electromagnetically engage with electromagnets 128A, 128B that comprise the pancake motor-generator stator. In FIG. 6A, c-shaped electromagnet cores 128A electromagnetically engage with a plurality of equally spaced permanent magnets 132 of alternating polarity mounted in a single row in perpendicular annular flange 113A located at the periphery of rotor 110. FIG. 6B shows two rows of permanent magnets 132 of alternating polarity located on flange 113B affixed to or integral with rotor 110. A series of pairs of u-shaped electromagnet cores 128B are located on either side of flange 113 so that cores 128B electromagnetically engage with permanent magnets 132. Using the perpendicular flange improves over the flat rotors of FIGS. 4A-4D in two ways. First, it stiffens the rotor, stiffening a large diameter rotor to reduce flexing and vibration. Second, it contributes to compactness.

Figure 7A:
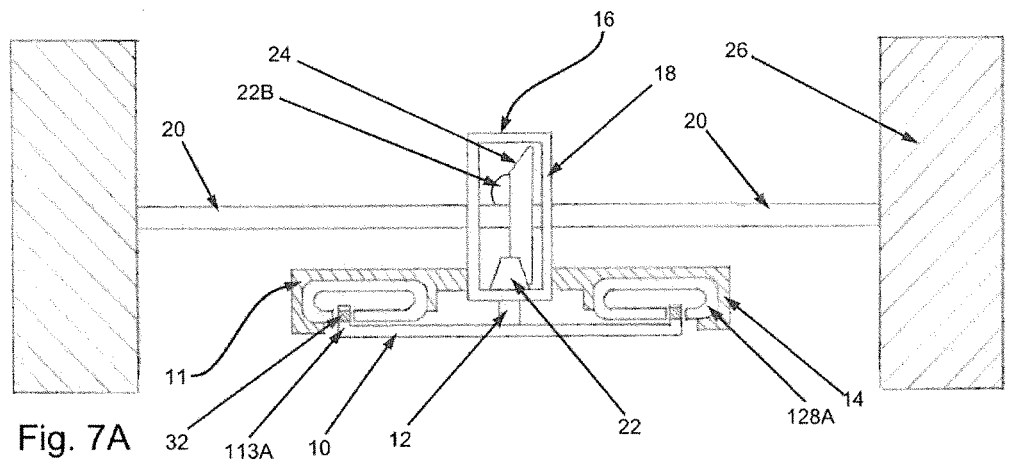
FIGS. 7A-7E illustrate cross-sectional views of an embodiment of the invention in a Formula One racing car.
Figure 7B:
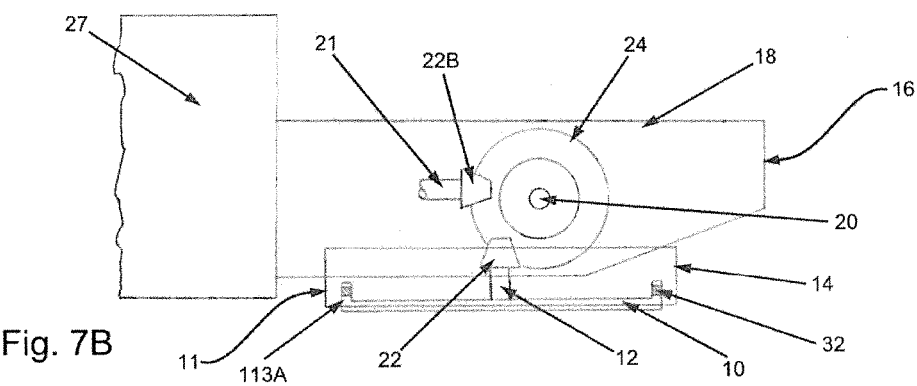
Figure 7C:
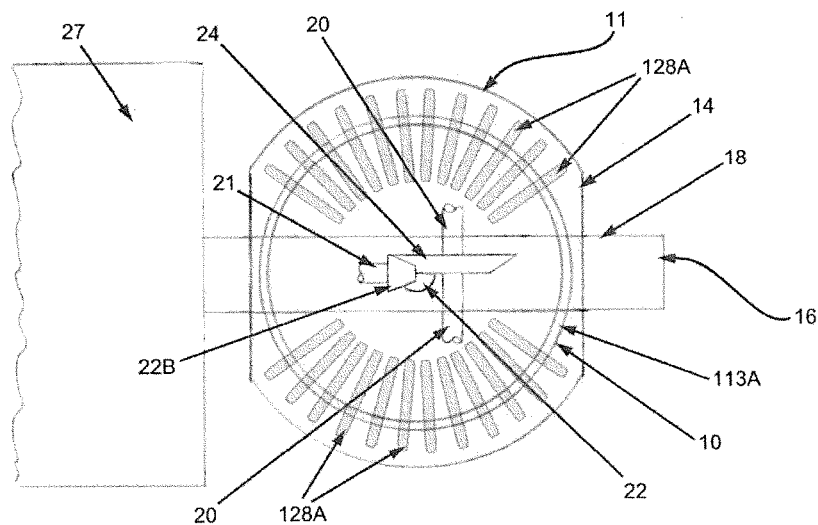

FIGS. 7A-7E illustrate schematic views of an embodiment of the invention in a Formula One (F1) racing car. F1 cars are mid-engined, rear-wheel-drive vehicles, with the engine mounted forward of the rear wheels, and a transaxle, a combination of transmission and final drive mechanism, rearward of the engine. For simplicity and clarity many components essential to F1 cars but not material to the invention have been omitted from the drawings. FIG. 7A depicts a cross-sectional view of the invention as seen from the rear of the vehicle. FIG. 7B depicts a cross-sectional side view of the invention with respect to the vehicle engine 27 and final drive mechanism 16. FIG. 7C is a cross-sectional view from above the final drive mechanism. Final drive mechanism 16 is affixed to engine 27. To obtain a low center of gravity, pancake motor-generator 11 may be located below final drive mechanism 16 which comprises final drive housing 18, ring gear 24, and pinion 22B affixed to transmission output-shaft 21. Also, since the pancake motor-generator 11 includes annular flange 113A (see FIG. 6A) on rotor 10, the pancake motor-generator 11 can be spaced higher above the ground in order to improve the ground clearance. A differential, not shown, is typically located adjacent to ring gear 24. Half-shafts 20 are affixed on either side of ring gear 24. Wheels 26 are mounted to hubs, not shown, which are affixed to half-shafts 20. Pancake motor-generator stator housing 14 is affixed to or is integral with final drive housing 18. Rotor 10 is affixed to rotor shaft 12 which is affixed to rotor shaft pinion 22. Rotor shaft pinion 22 engages with ring gear 24. A series of c-shaped electromagnet cores 128A is mounted in pancake motor-generator stator housing 14 on either side of final drive housing 18. A plurality of equally spaced permanent magnets 32 of alternating polarity is mounted on annular flange 113A which is affixed to or integral with rotor 10. Rotor 10 is mounted in such a fashion that the plurality of equally spaced permanent magnets 32 of alternating polarity may pass through the gaps in the series of c-shaped electromagnet cores 128A mounted in pancake motor-generator stator housing 14. Alternatively, the rotor of FIG. 6B with annular flange 113B and two rows of equally spaced permanent magnets 32 of alternating polarity and pairs of u-shaped cores 128B can be used.

Figure 7D:
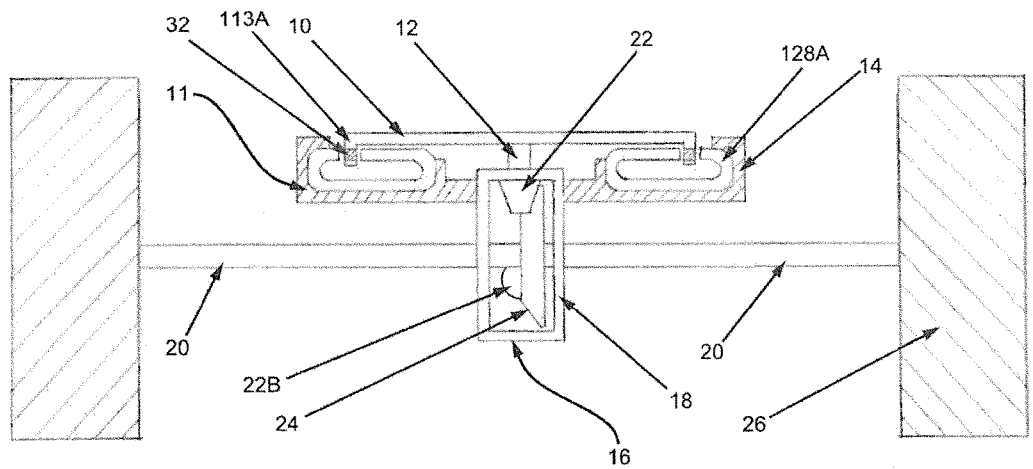
Figure 7E:
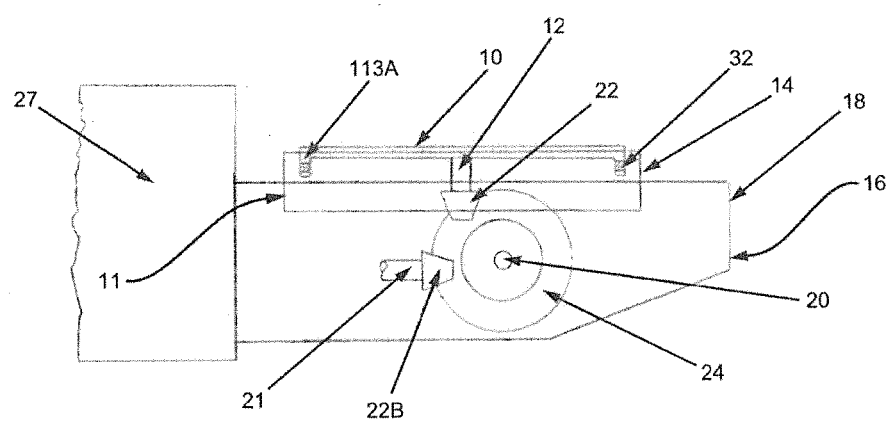

FIGS. 7D and 7E are cross-sectional views of the invention as seen from the rear and from the side of the vehicle respectively and depict an alternative embodiment of the invention for a F1 racing car application wherein the pancake motor-generator 11 is located above the final drive mechanism 16 so as not to encroach on underbody space required for aerodynamic downforce devices such as diffuser tunnels and venturis. Pancake motor-generator 11 includes annular flange 113A on rotor 10 to enable electromagnet cores 128A and stator housing 14 to be mounted below rotor 10 so as to obtain a lower vehicle center of gravity.

Figure 8:
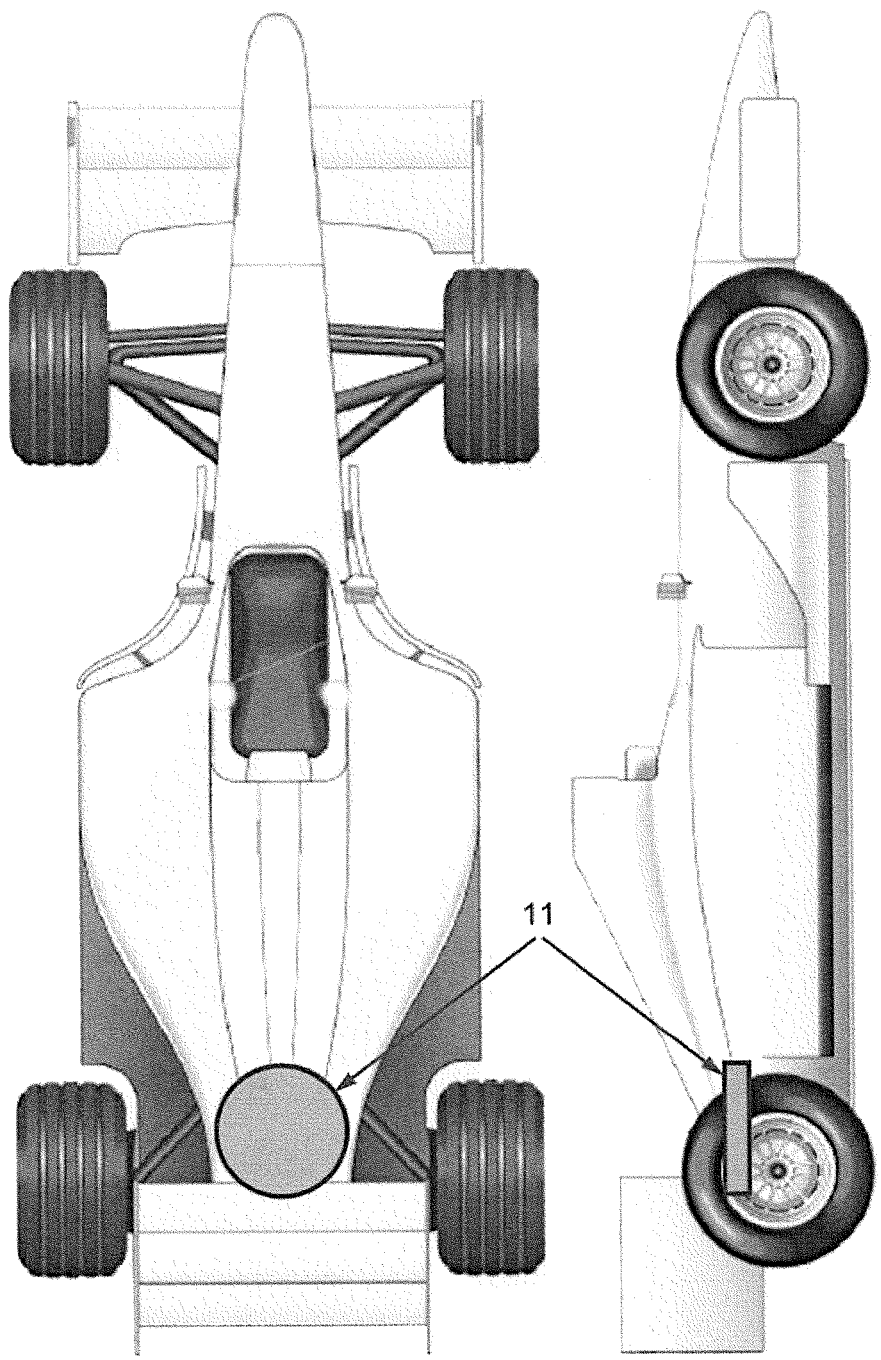
FIG. 8 schematically illustrates plan and side views of a Formula 1 racing car showing the location of a pancake electric motor-generator mounted above the vehicle's final drive mechanism.

FIG. 8 schematically illustrates plan and side views of a F1 racing car showing the location of a pancake electric motor-generator 11 mounted above the vehicle's final drive mechanism.

Figure 9:
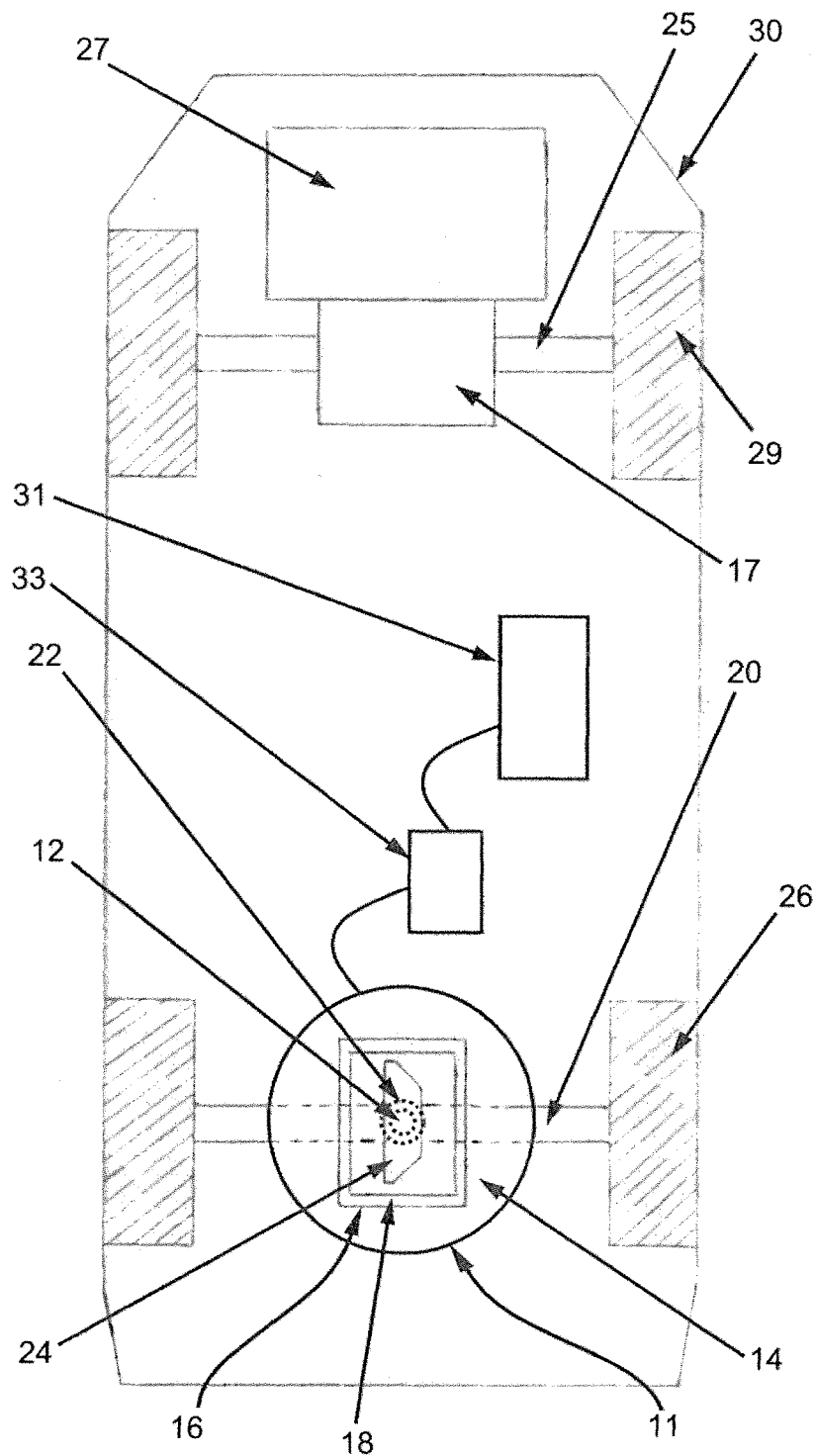
FIG. 9 is a schematic cutaway plan view of a front-wheel-drive vehicle fitted with a kinetic energy recovery and electric drive mechanism at the rear wheels.

FIG. 9 is a schematic cutaway plan view of a front-engined front-wheel-drive vehicle 30 showing engine 27 mounted to transmission 17, with front axles 25 taking the drive from transmission 17 to front wheels 29. Rear wheels 26 are driveably connected via rear axles 20 to rear-mounted final drive mechanism 16 which includes pinion 22 and ring gear 24.

Typically, a differential mechanism, not shown, would be incorporated into final drive mechanism 16 adjacent to ring gear 24. Pancake motor-generator 11 is mounted above rear-mounted final drive mechanism 16, with pancake motor-generator stator housing 14 affixed to or integrated with final drive housing 18. Ring gear 24 is affixed to rear axles 20 and engages with rotor pinion 22 affixed to rotor shaft 12. Rotor shaft 12 is affixed to the rotor (not shown) of pancake motor-generator 11. This embodiment of the invention enables a front-wheel-drive vehicle to be provided with all-wheel-drive functionality and capability, either full time or as needed, independent of the vehicle's primary motor. Specifically, during times when only front-wheel drive is employed, pancake motor-generator 11 is operated in generator mode and thereby generates electric current during braking and coasting operations. The electric current may be stored in a storage device 31, such as a battery or supercapacitor. During times when four-wheel-drive is employed, the pancake motor-generator 11 operates in motor mode and receives electric current from the storage device 31 to thereby drive the rear wheels 26. In this way, this embodiment may provide kinetic energy recovery during braking or coasting when the vehicle is operating only in front-wheel-drive mode and also provide all-wheel-drive capability, as desired. A controller 33 may be used to switch the pancake motor-generator 11 between motor and generator modes. The controller 33 may change the mode of the pancake motor-generator 11 based on an input from an operator of the vehicle, or in response to the operating condition of the vehicle.

It may be advantageous, due to space restrictions or other mechanical reasons, to locate the pancake motor-generator where the vehicle drive-shaft connects to the vehicle transmission, or, in the case of a front-engined, rear-wheel-drive vehicle having a drive-shaft connecting the transmission to the final drive/differential, at a suitable location along the length of the drive-shaft. The pancake motor-generator is mounted or horizontally, with the pancake motor-generator's rotor shaft perpendicular or vertical to the vehicle's horizontal drive-shaft and the pancake motor-generator located above or below the drive-shaft. A right angled drive or power transmission device, such as bevel gearset, is required to connect the vehicle's horizontal drive shaft to the vertical motor shaft. The latter arrangement is particularly advantageous in retrofitting vehicles having an engine at one end of the vehicle and a final drive or differential at the other end of the vehicle, coupled by a drive shaft, such as buses and trucks. Depending on clearance, it may also be retrofitted into passenger vehicles. And, of course, it can be designed into the structure of any kind of passenger vehicle.

Figure 10:
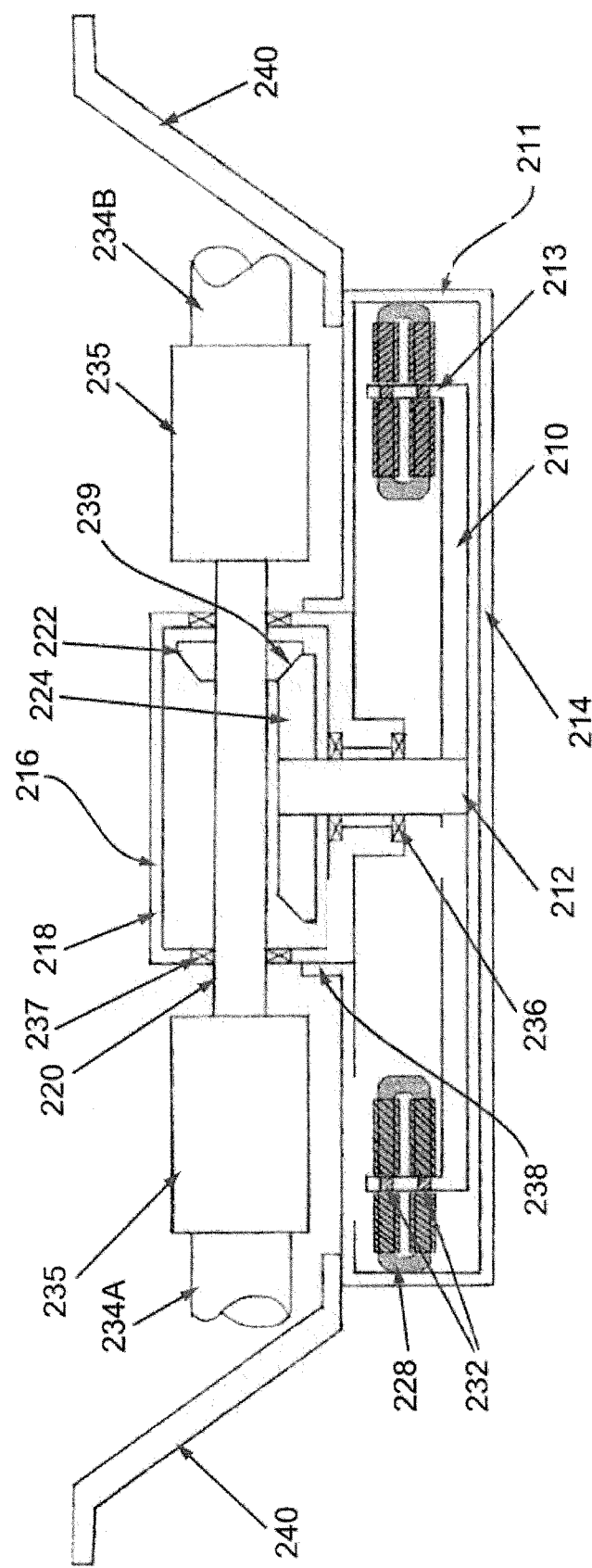
FIG. 10 is a cross-sectional elevation view of a further embodiment of the invention employing an improved version according to the invention of an electric pancake motor-generator as disclosed in the '460, '433 and '623 U.S. patents, the right angle gearbox located above the motor-generator.

In a preferred horizontally oriented pancake motor-generator embodiment, illustrated in FIG. 10, pancake motor-generator 211 is combined or integrated with gearbox 216 by means of pancake motor-generator stator housing 214 combined or integrated 238 with gearbox housing 218. The combined pancake motor-generator and gearbox unit is mounted to the vehicle chassis or frame, not shown, by means of mounting brackets 240. Gearbox 216 contains bevel gearset 239 comprising ring gear 224 and pinion gear 222 which are located in gearbox bearings 237. Ring gear 224 is affixed to pancake motor-generator shaft 212 and pinion gear 222 is affixed to gearbox shaft 220. Horizontally oriented gearbox shaft 220 is connected in line with the vehicle's drive shaft 234 by means of universal joints 235 located either side of gearbox 216. Pancake motor-generator 211 is fitted with vertical motor-generator shaft 212 which is located in motor-generator bearings 236. Vertically oriented motor-generator shaft 212 is affixed to horizontally oriented motor-generator rotor 210. A plurality of stator electromagnet U-cores 228 are mounted in radially located inner and outer mounting brackets or fitments, not shown, affixed to or integral with the interior of stator housing 214, and electromagnetically engage in the manner described above with a plurality of permanent magnets 232 of alternating polarity located in annular perpendicular cylindrical flange 213 affixed to or integral with rotor 210. The preferred form of pancake motor-generator for this orientation is the version shown in FIG. 6B because it enables a more compact structure and a stiffer rotor.

Electronic control devices are arranged to control the operation of the brushless electric pancake motor-generator. In the aforementioned embodiments, when the vehicle is in motion, pushing the brake pedal actuates the brake and simultaneously can actuate switches that cause the electric pancake motor-generator to generate electricity which is transferred to an electricity storage device. The stored electric power may automatically or at the driver's discretion be used to power the electric pancake motor-generator, acting as a motor, to supplement the vehicle's primary motor. The generator function may be wired and controlled to generate electric power while the vehicle is coasting. Releasing the accelerator switches the generator function on, and using the accelerator switches the generator function off. The brushless electric pancake motor-generator of the '460, '433 and '623 patents may be modified to energize the electromagnets in a sequence that is opposite to the direction of rotor rotation so as to retard the rotational speed of the rotor, thereby supplementing braking.

Figure 11:
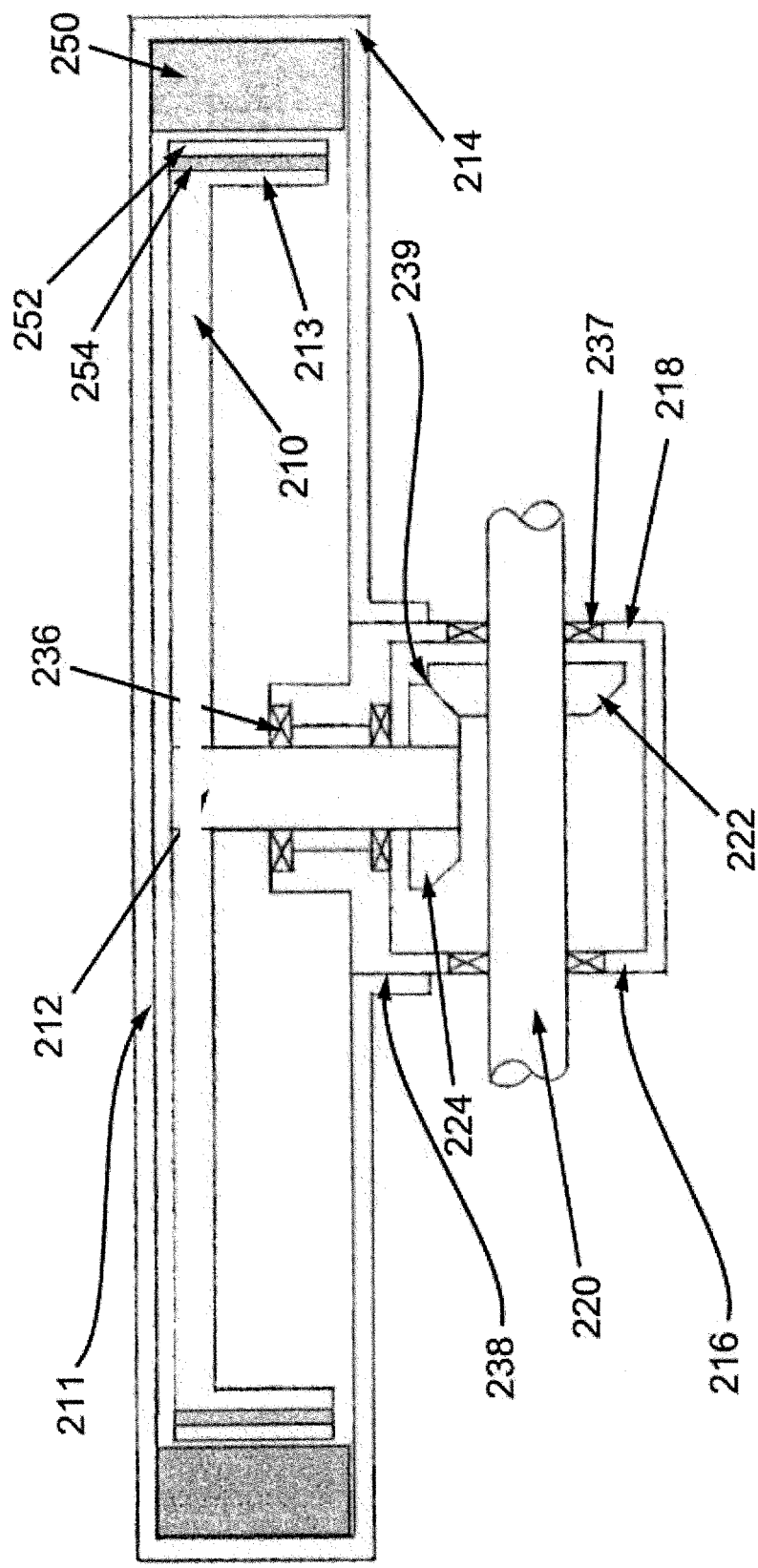
FIG. 11 is a cross-sectional elevation view of a further embodiment of the invention employing an alternative electric pancake motor-generator of type manufactured by Applimotion, Inc., the right angle gearbox located below the pancake motor-generator.
Figure 13A:
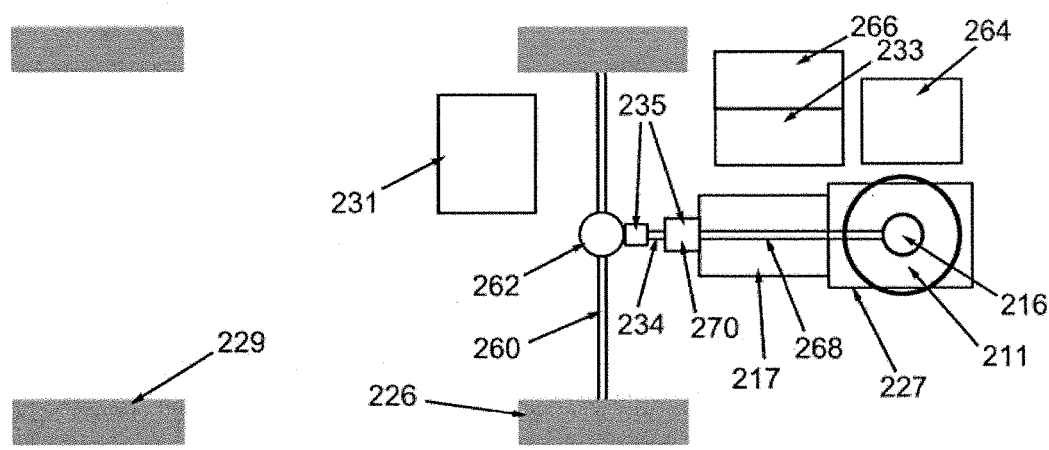
FIGS. 13A and 13B are schematic plan and side views respectively of an embodiment of the invention mounted in a rear engined vehicle.
Figure 13B:
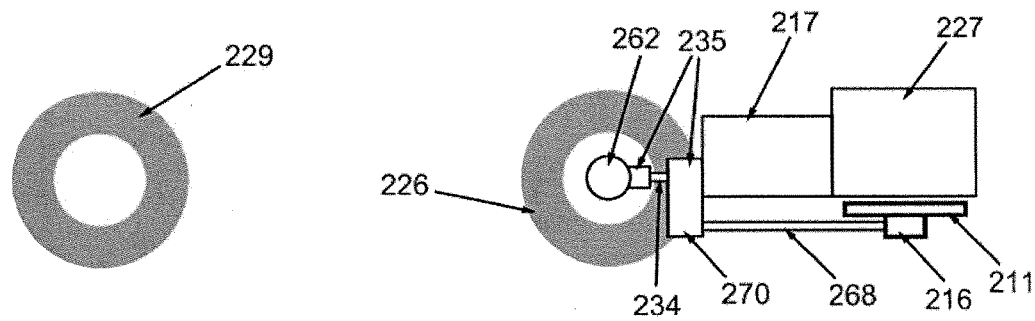

FIG. 11 illustrates an alternative horizontally oriented pancake motor-generator embodiment of the invention that employs an adaptation of a brushless permanent magnet pancake electric motor design as manufactured by Applimotion, Inc. of Loomis, Calif., USA. Pancake motor-generator 211 is combined or integrated with gearbox 216 by means of motor-generator stator housing 214 combined or integrated 238 with gearbox housing 218. Gearbox 216 contains bevel gearset 239 comprising ring gear 224 and pinion gear 222. Ring gear 224 is affixed to vertical motor-generator shaft 212 which is journaled in bearings 236 and pinion gear 222 is affixed to horizontally oriented gearbox shaft 220 which is journaled in bearings 237. Gearbox shaft 220 may be connected to or integral with layshaft 268 as shown in FIGS. 13A and 13B. Motor-generator shaft 212 is affixed to horizontally oriented motor-generator rotor 210. Annular perpendicular cylindrical flange 213 is affixed to or integral with rotor 210. Annular ring 254 of back iron is affixed around the outside of flange 213 and an annular ring comprising a series of permanent magnets 252 of alternating polarity is affixed around the outside of annular ring 254 of back iron. An annular stator 250, which typically comprises a stack of contoured laminated iron sheets wrapped with copper wire coils, not shown, is mounted in motor stator housing 214.

Electronic control devices are arranged to control the operation of the brushless electric pancake motor-generator. In the aforementioned embodiments, when the vehicle is in motion, pushing the brake pedal actuates the brake and simultaneously causes the electric pancake motor-generator to generate electricity which is transferred to an electricity storage device. The stored electric power may automatically or at the driver's discretion be used to power the electric pancake motor-generator, acting as a motor, to supplement the vehicle's primary motor. The generator function may be wired to generate electric power while the vehicle is coasting. Releasing the accelerator switches the generator function on, and using the accelerator switches the generator function off.

A further embodiment of the invention, depicted in FIGS. 12A and 12B, is applicable to front engined, rear-wheel-drive vehicles such as, but not limited to, trucks or school buses. Pancake electric motor-generator 211 in combination with right angled gearbox 216 is located on vehicle driveshaft 234 downstream of transmission 217 affixed to internal combustion engine 227. Driveshaft 234 is connected to final drive mechanism 262 mounted on rear axle 260. Rear wheels 226 are mounted on rear axle 260. Vehicle chassis, not shown, is fitted with front wheels 229. Battery 231 is connected to battery controller 266, and electric motor-generator 211 is connected to motor-generator controller 233. Hybrid controller 264 may be autonomous of the vehicle's systems or integrated with such systems. When required by hybrid controller 264, electric energy stored in battery 231 is discharged to power motor-generator 211 in motor mode, thereby adding accelerative motive power to driveshaft 234 via right angle gearbox 216. During braking, decelerating or coasting the vehicle's kinetic energy maintains the vehicle's forward motion and rotating driveshaft 234 rotates pancake motor-generator 211 via right angle gearbox 216. Hybrid controller 264 may switch pancake motor-generator 211 to generator mode to charge battery 231 during such braking, decelerating and coasting states.

A further embodiment of the invention, shown in FIGS. 13A and 13B, is applicable to rear engined, rear-wheel-drive vehicles such as, but not limited to, large city or transit buses.

In such vehicles the internal combustion engine 227 and transmission 217 are typically located aft of the rear axle 260, and a very short driveshaft 234 (often less than 12 inches in length) transmits the drive from transmission 217 to final drive mechanism 262 mounted on rear axle 260. Due to limited under-body, engine compartment and drive-line space in such vehicles there may be little or no space available to mount a conventional electric motor-generator of suitable power and torque. However, a low height pancake motor-generator 211 and right angled gearbox 216 combination may be mounted under the vehicle's internal combustion engine 227 and transmission 217 and still provide adequate ground clearance.

The short driveshaft 234 is typically located between two universal joints 235, one mounted on the transmission 217 output shaft, the other on final drive mechanism 262 mounted on rear axle 260. Because rear axle 260, typically a live rear axle, reacts to vertical suspension movements driveshaft 234 is constantly in vertical motion with rear axle 260 when the vehicle is in motion. This makes transmitting power to and from driveshaft 234 by means of a gearbox mounted on driveshaft 234 problematic. Bi-directional power coupling mechanism 270 incorporates a universal joint having one yoke combined with a gear to provide a power take-off from an element of the drive train that is not in vertical motion relative to the vehicle's transmission 217 or internal combustion engine 227.

Vehicle chassis, not shown, is fitted with front wheels 229. Battery 231 is connected to battery controller 266, and electric motor-generator 211 is connected to motor-generator controller 233. Hybrid controller 264 may be autonomous of the vehicle's systems or integrated with such systems. When required by hybrid controller 264, electric energy stored in battery 231 is discharged to power motor-generator 211 in motor mode, thereby adding accelerative motive power to layshaft 268 via right angle gearbox 216. During braking, decelerating or coasting the vehicle's kinetic energy maintains the vehicle's forward motion and rotating driveshaft 234 rotates pancake motor-generator 211 via bi-directional power coupling mechanism 270 which transmits the drive via layshaft 268 to right angle gearbox 216. Hybrid controller 264 may switch pancake motor-generator 211 to generator mode to charge battery 231 during such braking, decelerating and coasting states.

Figure 14:
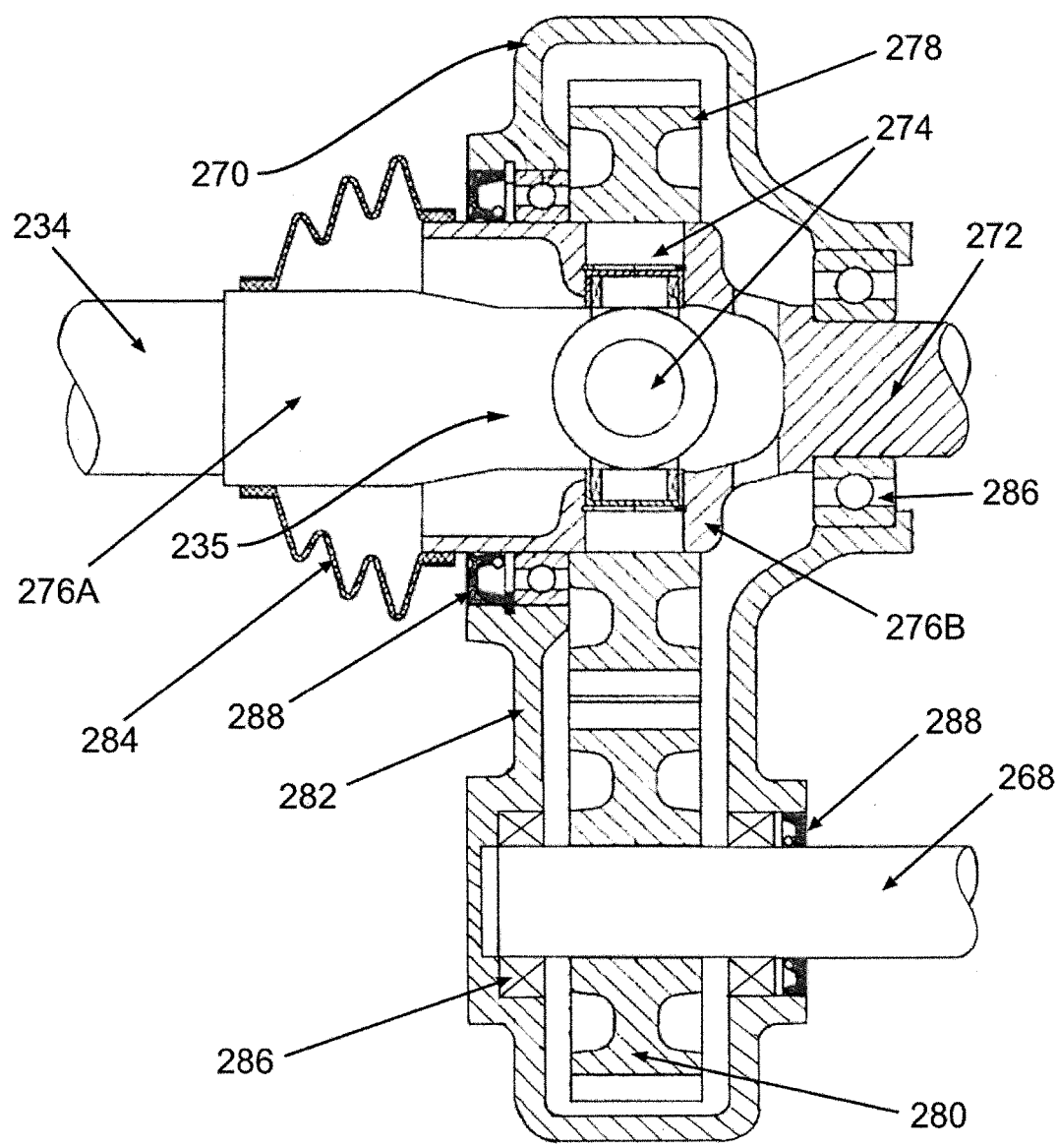
FIG. 14 is a cross-sectional side view of the bi-directional power coupling of FIGS. 13A and 13B including a spur gear located around the yoke of a universal joint as disclosed in U.S. Pat. No. 6,290,605.

In an embodiment of a bi-directional power coupling mechanism 270, illustrated in FIG. 14, spur gear 278 is affixed to or made integral with transmission-side yoke 276B of universal joint 235 located on transmission output shaft 272, in the manner disclosed in U.S. Pat. No. 6,290,605 titled "Assembly comprising a universal joint and a gear for a drive".

Spur gear 278 engages second spur gear 280 affixed to layshaft 268. Yoke 276A is affixed to driveshaft 234. Yokes 276A and 276B are rotatably mounted on universal joint spider 274. Transmission output shaft 272 and layshaft 268 are rotatably mounted in bearings 286. Seals 288 prevent contaminants entering and lubricant leaving bi-directional power coupling mechanism 270, as does flexible boot 284 while permitting yoke 276A affixed to driveshaft 234 freedom of angular movement. Layshaft 268 transmits drive to and from pancake motor-generator 211 and right angled gearbox 216 combination located under the vehicle's rear mounted internal combustion engine 227 as shown in FIGS. 13A and 13B. Alternatively a chain or toothed belt may be used in place of gears, with a sprocket or a grooved toothed belt pulley integral or combined with yoke 276B of universal joint 235 coupling the driveshaft 234 to the transmission 217.

Figure 15:
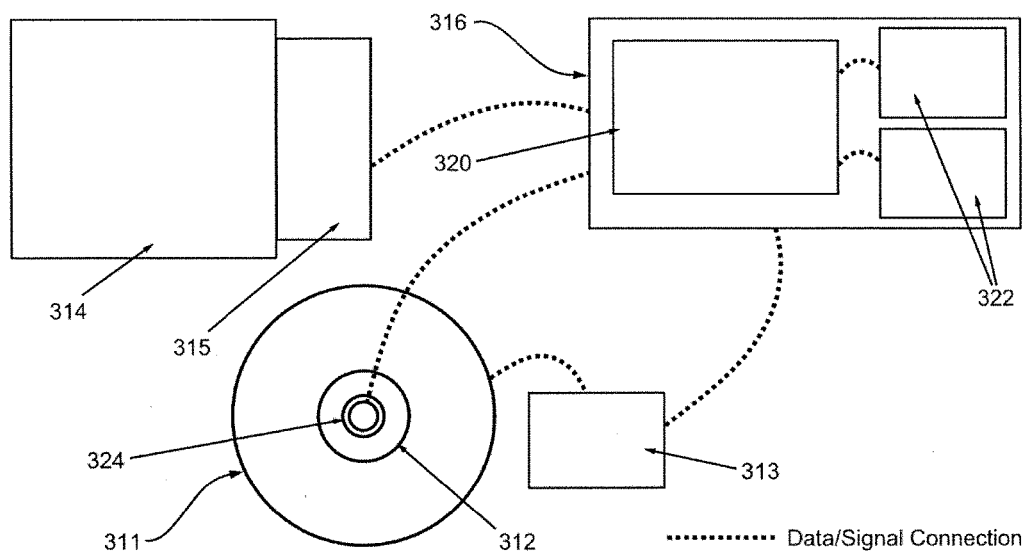
FIG. 15 is a schematic illustration of an autonomous hybrid control system according to another aspect of the invention.

FIG. 15 is a schematic illustration of an autonomous hybrid control system showing battery 314, battery management system 315, electric pancake motor-generator 311 fitted with ball bearing rotation sensor 324, motor-controller 313 and autonomous hybrid controller 316 comprising electronic control unit (ECU) 320 and sensors 322. Sensors 322 may include accelerometers or other appropriate sensors as described below.

Figure 16:
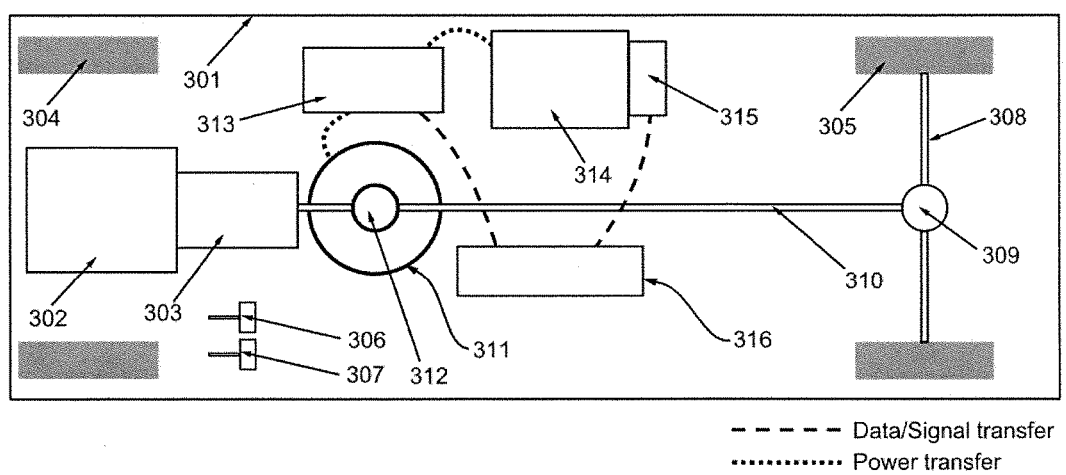
FIG. 16 is a schematic plan view of a kinetic energy recovery system including an autonomous hybrid controller of FIG. 15 mounted in a vehicle chassis.

FIG. 16 is schematic plan view of a kinetic energy recovery system mounted in vehicle chassis 301, such as a school bus, and shows autonomous hybrid controller 316 connected to motor-generator controller 313 and battery management system 315. Also shown are internal combustion engine 302, transmission 303, front wheels 304, rear wheels 305, accelerator pedal 306, brake pedal 307, rear axle 308, differential 309, driveshaft 310, pancake motor-generator 311, right-angle gearbox 312, motor controller 313, battery 314, battery management system 315, and autonomous hybrid controller 316.

Autonomous hybrid controller 316 comprises sensors 322, which may include, but are not limited to, accelerometers and motion, speed, rotation, thermal and inclination sensors which are electronically connected to electronic control unit (ECU) 320. Hybrid controller 316 communicates electronically with a Hall Effect sensor in motor bearing 324, to receive input data and signals, and with motor-generator controller 313 which controls electric motor-generator 311. Autonomous hybrid controller 316 communicates electronically with battery management system 315 which monitors and manages hybrid power storage battery 314. The autonomous hybrid controller 316 need not be connected to or integrated with any of the systems in the vehicle chassis 301, namely internal combustion engine 302, transmission 303, accelerator pedal 306, brake pedal 307 and friction brakes (not shown) located within front and rear wheels 304 and 305. When vehicle chassis 301 travels forward or rearward, or is stationary, sensors 322 and Hall Effect sensor bearing 324 detect vehicle movement as acceleration, deceleration, speed, direction and inclination or lack thereof, and electronically transmit data and signals reflecting these states to ECU 320. ECU 320 uses this input to command motor-generator controller 313 to switch pancake motor-generator 311 to motor, generator and no-load modes as required, and depending upon hybrid power storage battery 314 status as monitored and controlled by battery management system 315.

Since the autonomous hybrid controller is independent of the vehicle's various systems, including the engine, gearshift, accelerator and brake pedals, and requires no interface with them, it enables a quick and simplified retrofit installation process. From a design and manufacturing standpoint it permits a retrofit hybrid controller without cooperation or assistance from the vehicle or subsystem original equipment manufacturers.

The following is an explanation of the possible sensor inputs that may be used with the Autonomous Controller. Any of them may be used singularly or in combination with others to fully optimize the performance of the controller. They are listed individually with a description of the unique value each sensor provides.

In these descriptions references to the electric motor are simply 'motor' or 'motor-generator' and references to the fueled engine (gasoline, diesel, etc.) are 'engine'.

1. Motor speed—inherent in the control system for an electric motor is the ability for the controller to adjust the timing and sequencing of energizing the motor coils. The assumption under these conditions is that the motor is indeed turning at the speed intended. It is possible to incorporate internal electronics to the circuitry to verify the behavior is as expected and that the motor is indeed turning at the rate intended. This internal sensing may be used by the controller as a feedback loop to alter the behavior of various characteristics of the controller to compensate for varying conditions the motor is encountering. These conditions (such as but not limited to temperature, orientation, ambient electromagnetic fields, etc) may degrade the expected motor performance and the feedback may be used to identify the need for the controller to initiate compensating or correcting signals back to the motor.

In addition to the endemic feedback sensing, it may be useful to provide an auxiliary motor speed input to the controller. This sensor is expected to be external to the controller however it may be mounted in or on the same housing as the controller. The sensor may be any of various types commercially available including but not restricted to Hall effect, Wiegand effect, optical, contacting, or other devices noting the movement of a rotating element with respect to a fixed element. The sensor of choice may be mounted directly to the motor housing or may be located at any position adjacent to any of the rotating elements that provide useful information to the controller by representing the true rotation of the electric motor.

2. Acceleration (accelerometer)—a device such as an accelerometer (of various commercial constructions) may be used to provide unique input to the motor controller. If the accelerometer is oriented to detect acceleration along the fore/aft axis of the vehicle it can be used to interpret the behavior of the vehicle as directed by the driver and provide information for the controller to use to augment, assist, or release the contribution of the motor/generator with regard to the system.

If the driver is intending to accelerate from a stationary position they release the brake and apply their foot to the accelerator. As the accelerometer senses the vehicle is increasing speed in the forward direction the output of the accelerometer is directed to the controller where the logic of the controller can incorporate that data and alter the signals driving the motor. Under the control programming for this hybrid application the signals from the controller to the motor would direct the motor to apply more torque to the driveline such that less engine power would be consumed during that period of acceleration.

Once the acceleration sensor detects a zero or near-zero state the interpretation is that the vehicle has achieved a constant speed. Under the control programming for this hybrid application the signals from the controller to the motor would direct the motor to become free-wheeling, neither adding to nor detracting from the power the engine is applying to the driveline.

If the accelerometer detects a deceleration in the forward direction the interpretation is that the driver is either coasting (a near-zero rate of deceleration) or may be applying the brake to a varying degree (intentional slowing). Under the control programming for this hybrid application the signals from the controller to the motor would direct the motor to act as a generator and apply a resistive force to its rotation to assist in slowing the vehicle down. This may be in conjunction with the engine slowing down as well until such time as the driver has either stopped the vehicle, or lifted from the brake and achieved a steady speed, or chosen to accelerate again.

The accelerometer is perhaps the most useful means of interpreting the intention of the driver simply by monitoring the behavior of the vehicle and augmenting it according to the programming logic used in the controller. The description above is only one such application of that logic and is described in a simplistic manner. The transitions of the control logic may be implemented in any manner the programmer determines to be advantageous to the performance goals of the vehicle and driver and may include additional incremental levels depending on the precision and resolution of signal available from the accelerometer.

3. Incline (inclinometer)—the inclinometer is a sensor that provides a signal proportional to the angle at which it is moved. In typical devices the signal reports whether the angle is upward or downward. Some devices may be used in conjunction with time measurements to determine the rate at which the inclination or rotation of the system occurs. The inclinometer sensor may be used alone or in concert with other sensors to the motor controller to provide unique information for the logic programming of the controller to respond to. If the inclinometer is oriented fore/aft to the axis of movement of the vehicle it can report the vehicle angle with respect to level ground. This information can be used to infer the vehicle is on an incline (hill) facing upward or downward. The logic programming may thus associate a need for additional power from the motor when climbing the hill, thereby assisting the engine. Similarly it may associate the need to retard the rotation of the driveline when the vehicle is going down a hill, thereby acting as a generator to recharge the batteries and maintain control, or even slow the progress of the vehicle.

4. Temperature:
   4a. Cooling system—electric motors are subject to heating from their internal conversion of energy to mechanical power, and similarly when acting as a generator to convert rotational energy into electricity. When doing so there is a change in the efficiency of the system depending on what its operating temperature is. Most systems of substantial energy rates such as those used in a heavy vehicle may require an auxiliary cooling system. Use of a temperature sensor to monitor the efficacy of a cooling system and therefore the condition of the motor/generator may be used to alter the manner in which the motor/generator is being controlled. For example, if the cooling system is identified to be operating at a high temperature the controller may then moderate the amount of involvement of the motor/generator until such time as the temperature is determined to be more optimum for greater levels of motor/generator activity. This may be a reflection of the condition of cooling system components, the driving conditions, the vehicle loading, or various other factors which may not be otherwise identified yet may have an impact on the overall system performance.
   4b. Ambient Conditions—as indicated in the above paragraph the temperature conditions of the entire system may have some bearing on the efficacy of the system to provide the desired assist/retard effects to the vehicle. In conditions of extreme cold or extreme heat the limitations of the controller and motor may require a different set of logic parameters. Addition of an ambient air temperature sensor may be used to provide automatic performance compensation under those conditions.

5. Humidity—as described earlier regarding temperature, other atmospheric conditions such as humidity can later the normal behavior of a motor/generator. If the controller is configured with a sensor input for humidity, the controller logic can factor the conditions to the optimum performance and safe operation of the system in general.

6. Barometric Pressure—similar to the humidity sensor described above, the sensing of barometric pressure may be used to infer the altitude at which the vehicle is operating and by that inference the performance of the electric motor can be altered accordingly. At high altitudes there are some spurious effects on electronic systems and similarly high altitudes also imply some inefficiencies in typical engine performance which may be compensated for by the motor/generator controller.

7. Generic Digital Interface—any electronic control system can make use of various sensors or external devices that have a standard interface for either one-way or bi-directional communication. A generic digital interface such as RS-232, USB, or many other standardized or non-standard interfaces may be used to provide information or conditional data to the controller that may alter the manner in which the logic controls the motor/generator. A digital interface may be configured to be compatible with a Global Positioning System (GPS) device or other universal positioning system yet to be defined.

8. Generic Analog Interface—similar to the digital interface mentioned above, an analog sensor input may be configured on the controller such as a current loop adapter or various other standard and non-standard interfaces in order to augment the data available to the controller to alter the manner in which the logic controls the motor-generator.

9. Voltage or Current Sensors—an input port for sensing either voltage levels or current levels may be incorporated in the autonomous controller for the sole purpose of monitoring the condition of the energy storage system (such as batteries). The result of sensing the battery condition is important for the controller to alter the manner in which it applies signals to the motor/generator. For example, if the voltage sensor input indicates the battery capacity is approaching zero the controller logic may be configured to reduce the draw from the battery system or even to switch to a generator mode in order to restore some battery storage in anticipation of the next demand on the system.

Under some circumstances it may be desirable to know what the rotation speed of the engine is in order to anticipate the intentions of the driver with regards to acceleration, steady speed, or deceleration. The autonomous controller by definition is not intended to connect into the control system of the engine however a current sensor can be placed adjacent to the engine, around an ignition wire (if present), or around a wire to/from the alternator to sense the regular pulses of the engine that are associated to the engine speed. Either the voltage or the current may be reported back to the input port on the controller and the logic of the controller may make use of that information in determining how it chooses to direct the motor-generator.

Similarly, a sensor may be placed adjacent or around the wire(s) going to or from the brake lights or any other electrical wires in the vehicle such that when the selected wires are energized, the sensors can identify that action via induction and report that activity to the controller which may alter the logic for controlling the motor-generator accordingly.

It is important to note for the autonomous controller that none of the sensors mentioned above are attempting to connect directly into any existing subsystem (motor, throttle, brake, driver, etc) on the vehicle.

Having described and illustrated the principles of the invention in the preferred embodiments thereof it should be apparent that the invention can be modified in arrangement and detail without departing from such principles. We claim all modifications and variations coming within the spirit and scope of the invention. The foregoing description is only exemplary of the principles of the invention. Many modifications and variations of the present invention are possible in light of the above teachings. The preferred and alternative embodiments of this invention have been disclosed, however, so that one of ordinary skill in the art will recognize that certain modifications and variations would come within the scope of this invention.

What is claimed is:

1. A kinetic energy recovery and drive mechanism for a powered vehicle, the powered vehicle including a driveshaft coupling an internal combustion engine and a transmission to a final drive mechanism which is coupled via one or more axles to one or more wheels, the driveshaft and axles axially arranged in a horizontal orientation;
   the kinetic energy recovery and drive mechanism comprising:
   a pancake format, large diameter hydraulic motor having a stator housing and a rotor having a rotor shaft rotatable about a vertical axis; and
   a right angle gearbox mounted such that the right angle gearbox housing is fixedly coupled to the stator housing;
   the pancake format, large diameter motor further being mounted so that the axis of rotation of the rotor shaft is oriented substantially vertical and substantially perpendicular relative to the driveshaft of the vehicle so that a diameter of the motor extends in a plane substantially parallel to the driveshaft; and
   the right angle gearbox being affixed to or integral with the stator housing of the pancake format motor and including a right angle bevel gearset that engages the vertical rotor shaft to the horizontal driveshaft to enable the perpendicular transmission of drive from the vertical rotor shaft to the horizontal driveshaft of the vehicle.

2. The kinetic energy recovery and drive for powered vehicles of claim 1 in which the vehicle is a rear engined, rear drive vehicle including a rear axle, a rear final drive mechanism, a driveshaft, a transmission and an engine positioned rearward of the rear axle, the driveshaft coupling the final drive mechanism to the transmission via universal joints located at each end of the driveshaft and the engine mounted aft of the transmission, the pancake format large diameter motor located under the transmission or engine with its rotor shaft vertically oriented, the right angle gearbox drivably couples the rotor shaft with a horizontally oriented layshaft that is drivably coupled to the driveshaft via a bidirectional power coupling mechanism.

3. The kinetic energy recovery and drive for powered vehicles of claim 2 in which the horizontal layshaft is drivably coupled by means of gears, chains or toothed belts to the driveshaft by the use of a gear, a sprocket or a grooved or toothed pulley integral or combined with a yoke of a universal joint coupling the driveshaft to the transmission.

4. The kinetic energy recovery and drive for powered vehicles according to claim 1 in which the stator housing of the pancake format large diameter motor is affixed to or integrated with the right angle gearbox housing of the right angle gearbox either above the right angle gearbox or under the right angle gearbox.

5. The kinetic energy recovery and drive for powered vehicles according to claim 1 in which the pancake format large diameter motor includes a housing and the right angle gearbox includes a housing in which the housings are coupled or integrated together.

6. The kinetic energy recovery and drive for powered vehicles according to claim 1 in which the pancake format large diameter motor includes a vertical rotor shaft which engages via a power transmission mechanism selected from a group including gear drives and friction drives including single ratio, multiple changeable ratios or continuously variable ratios, to the right angle gearbox or to a power transmission mechanism selected from a group including a gear drive or friction drive located on the driveshaft or transmission output shaft adjacent to the right angle gearbox.

7. A kinetic energy recovery and drive mechanism for a powered vehicle, the powered vehicle including a driveshaft coupling an internal combustion engine and a transmission to a final drive mechanism which is coupled via one or more axles to one or more wheels, the driveshaft and axles axially arranged in a horizontal orientation;
the kinetic energy recovery and drive mechanism comprising:
a pancake format, large diameter hydraulic motor having a stator housing and a rotor having a rotor shaft rotatable about a vertical axis; and
the final drive mechanism having a final drive housing fixedly coupled to the stator housing;
the pancake format, large diameter motor mounted so that the axis of rotation of the rotor shaft is oriented substantially vertical and substantially perpendicular relative to the axle of the vehicle so that a diameter of the motor extends in a plane substantially parallel to the axle; and
the final drive mechanism including a right angle bevel gearset that engages the vertical rotor shaft to the horizontal axle to enable the perpendicular transmission of drive from the vertical rotor shaft to the horizontal axle of the vehicle.

8. The kinetic energy recovery and drive for powered vehicles of claim 7 in which the vehicle is a rear engined, rear drive vehicle including a rear axle, a rear final drive mechanism, a driveshaft, a transmission and an engine positioned rearward of the rear axle, the driveshaft coupling the final drive mechanism to the transmission via universal joints located at each end of the driveshaft and the engine mounted aft of the transmission, the pancake format large diameter motor located under the transmission or engine with its rotor shaft vertically oriented, the right angle gearbox drivably couples the rotor shaft with a horizontally oriented layshaft that is drivably coupled to the driveshaft via a bidirectional power coupling mechanism.

9. The kinetic energy recovery and drive for powered vehicles of claim 7 in which the horizontal layshaft drivably coupled by means of gears, chains or toothed belts to the driveshaft by the use of a gear, a sprocket or a grooved or toothed pulley integral or combined with a yoke of a universal joint coupling the driveshaft to the transmission.

10. A kinetic energy recovery and drive for powered vehicles according to claim 7 in which the stator housing of the pancake format large diameter motor is affixed to or integrated with the right angle gearbox housing of the right angle gearbox either above the right angle gearbox or under the right angle gearbox.

11. A kinetic energy recovery and drive for powered vehicles according to claim 7 in which the pancake format large diameter motor includes a housing and the right angle gearbox includes a housing in which the housings are coupled or integrated together.

12. A kinetic energy recovery and drive for powered vehicles according to claim 7 in which the pancake format large diameter motor includes a vertical rotor shaft which engages via a power transmission mechanism selected from a group including gear drives and friction drives including single ratio, multiple changeable ratios or continuously variable ratios, to the right angle gearbox or to a power transmission mechanism selected from a group including a gear drive or friction drive located on the driveshaft or transmission output shaft adjacent to the right angle gearbox.

13. A kinetic energy recovery and drive for powered vehicles according to claim 7 in which the stator housing of the pancake format large diameter motor is affixed to or integrated with the final drive mechanism either above the final drive mechanism or under the final drive mechanism.

14. A kinetic energy recovery and drive for powered vehicles according to claim 7 in which the pancake format large diameter motor includes a vertical rotor shaft which engages via a power transmission mechanism selected from a group including gear drives and friction drives including single ratio, multiple changeable ratios or continuously variable ratios to the final drive mechanism or to a power transmission mechanism selected from a group including a gear drive or friction drive located on the driveshaft or transmission output shaft adjacent to the final drive mechanism.

* * * * *